United States Patent
Fujiki

(10) Patent No.: US 11,062,422 B2
(45) Date of Patent: Jul. 13, 2021

(54) IMAGE PROCESSING APPARATUS, IMAGE COMMUNICATION SYSTEM, IMAGE PROCESSING METHOD, AND RECORDING MEDIUM

(71) Applicant: Hirochika Fujiki, Kanagawa (JP)

(72) Inventor: Hirochika Fujiki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/999,443

(22) Filed: Aug. 21, 2020

(65) Prior Publication Data

US 2021/0065331 A1    Mar. 4, 2021

(30) Foreign Application Priority Data

Aug. 26, 2019  (JP) ............................. JP2019-153482

(51) Int. Cl.
*G06T 3/00* (2006.01)
*G06Q 50/16* (2012.01)

(52) U.S. Cl.
CPC ........... *G06T 3/0062* (2013.01); *G06Q 50/16* (2013.01); *G06T 3/0018* (2013.01)

(58) Field of Classification Search
CPC ...... G06T 3/0062; G06T 3/0018; G06Q 50/16
See application file for complete search history.

(56) References Cited

U.S. PATENT DOCUMENTS

| | | | |
|---|---|---|---|
| 10,708,507 B1 * | 7/2020 | Dawson | H04N 5/232945 |
| 2013/0077869 A1 * | 3/2013 | Teshima | G06K 9/38 |
| | | | 382/195 |
| 2013/0308854 A1 * | 11/2013 | Hosokawa | G06T 5/50 |
| | | | 382/159 |
| 2014/0002440 A1 * | 1/2014 | Lynch | G06T 19/00 |
| | | | 345/419 |
| 2014/0049537 A1 * | 2/2014 | Sahoo | G09G 5/026 |
| | | | 345/419 |
| 2015/0131924 A1 * | 5/2015 | He | G06T 3/0018 |
| | | | 382/284 |
| 2016/0241836 A1 * | 8/2016 | Cole | G06T 17/20 |
| 2016/0381291 A1 * | 12/2016 | Han | H04N 5/23238 |
| | | | 348/39 |
| 2017/0069122 A1 * | 3/2017 | Lee | G06T 1/0007 |
| 2018/0075652 A1 * | 3/2018 | Kim | G06T 19/003 |
| 2019/0041972 A1 * | 2/2019 | Bae | G06F 3/011 |
| 2019/0132521 A1 * | 5/2019 | Fujita | H04N 5/23238 |
| 2020/0005428 A1 * | 1/2020 | Sedeffow | G06T 3/0062 |
| 2020/0007841 A1 * | 1/2020 | Sedeffow | G06T 7/70 |

FOREIGN PATENT DOCUMENTS

| | | |
|---|---|---|
| JP | 2011-244116 | 12/2011 |
| JP | 2015-018013 | 1/2015 |
| JP | 2016-219879 | 12/2016 |

* cited by examiner

*Primary Examiner* — Phi Hoang
(74) *Attorney, Agent, or Firm* — Harness, Dickey & Pierce, P.L.C.

(57) ABSTRACT

An image processing apparatus is configured to acquire an image that is a partial predetermined area of an image related to image data. The image processing apparatus includes processing circuitry configured to acquire a narrow-angle image that is a predetermined area of a wide-angle image, based on a structure of a building represented in the wide-angle image that is an entire region or a partial region of the image related to the image data.

19 Claims, 36 Drawing Sheets

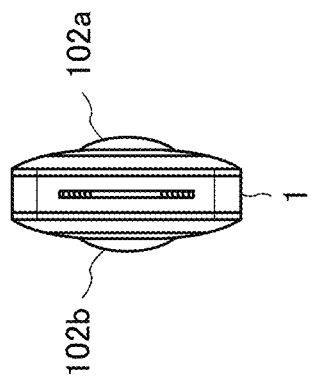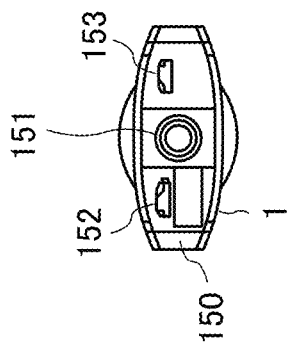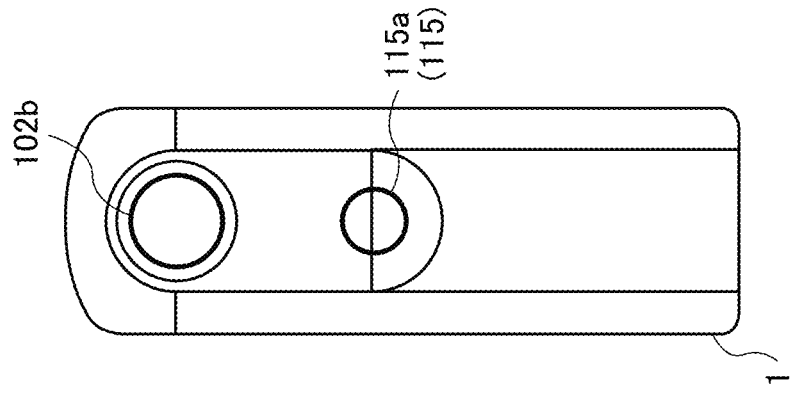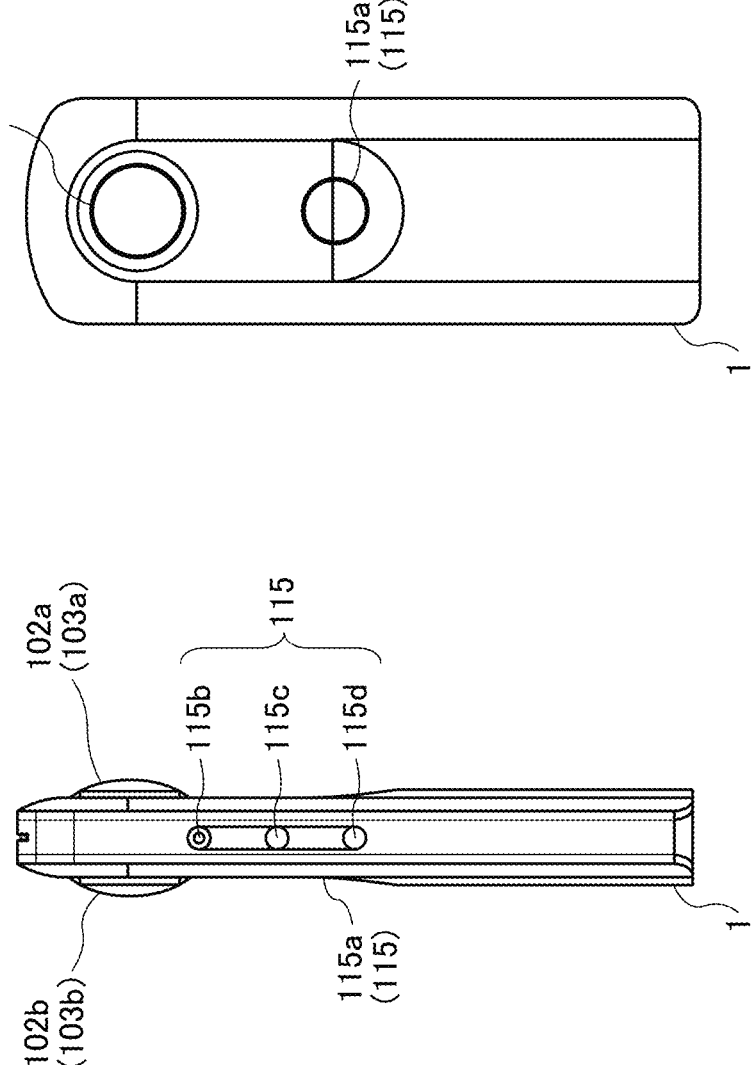

HEMISPHERE IMAGE (FRONT SIDE)

HEMISPHERE IMAGE (BACK SIDE)

EQUIRECTANGULAR PROJECTION IMAGE EC (WIDE-ANGLE IMAGE)

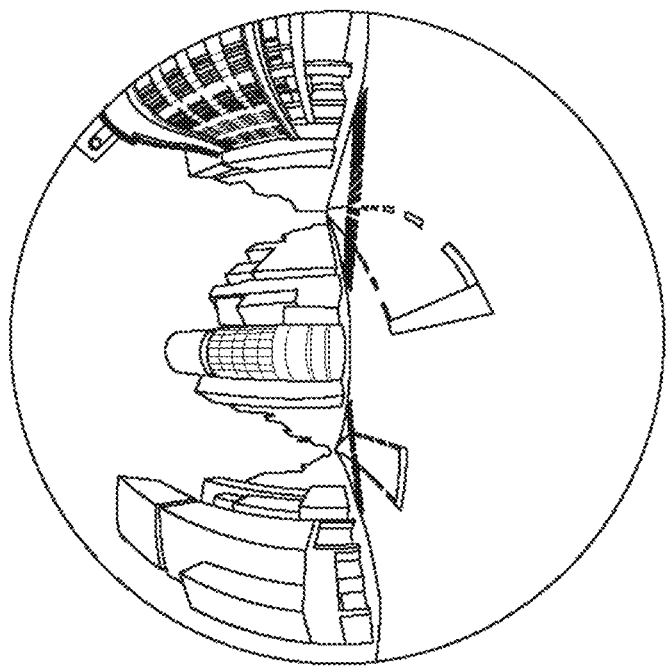
FIG. 4B
SPHERICAL IMAGE CE
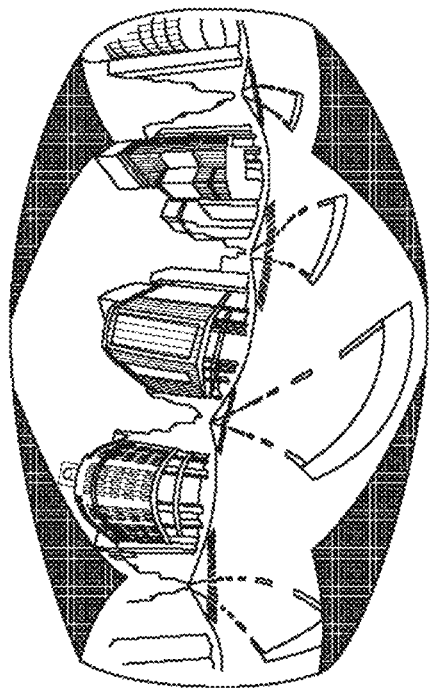 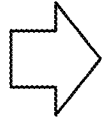 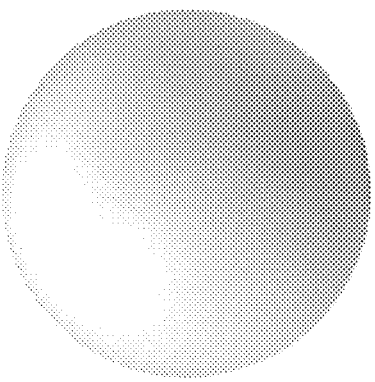
FIG. 4A
EQUIRECTANGULAR PROJECTION IMAGE EC

FIG. 12

IMAGE MANAGEMENT TABLE

| IMAGE ID | IMAGE DATA |
|---|---|
| Room1 | 00010010... |
| Room2 | 00111011... |

FIG. 14

PARAMETER MANAGEMENT TABLE

| PARAMETER | INITIAL PARAMETER | DESIGNATED PARAMETER |
|---|---|---|
| IMAGE ANGLE $\alpha$ | 100 | |
| PAN ANGLE $\theta$ | — | — |
| TILT ANGLE $\phi$ | 0 | |
| HEIGHT H | 640 | |
| WIDTH W | 720 | |

FIG. 15A

CUTOUT PARAMETER MANAGEMENT TABLE

| Room1 – crop01 – a1 | CUTOUT PARAMETER | ADJUSTMENT VALUE |
|---|---|---|
| IMAGE ANGLE α | 120 | 0 |
| PAN ANGLE θ | 74 | 0 |
| TILT ANGLE φ | 5 | 0 |
| HEIGHT H | 640 | 0 |
| WIDTH W | 720 | 0 |
| UPLOAD FLAG | TRUE | |

FIG. 15B

| Room1 – crop01 – a1 | CUTOUT PARAMETER | ADJUSTMENT VALUE |
|---|---|---|
| IMAGE ANGLE α | 120 | +10 |
| PAN ANGLE θ | 74 | −10 |
| TILT ANGLE φ | 5 | −5 |
| HEIGHT H | 640 | +60 |
| WIDTH W | 720 | −20 |
| UPLOAD FLAG | TRUE | |

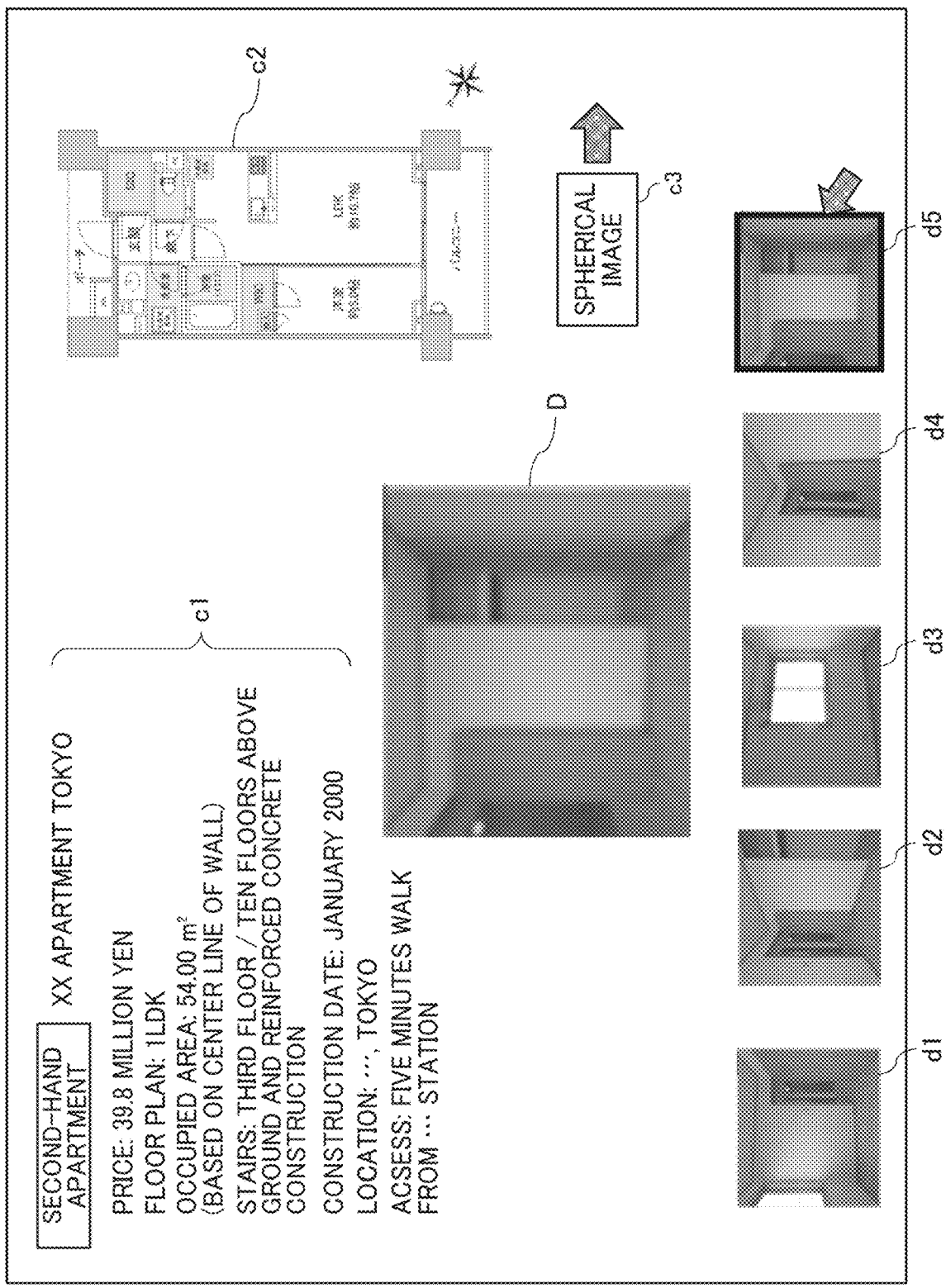

IMAGE PROCESSING APPARATUS, IMAGE COMMUNICATION SYSTEM, IMAGE PROCESSING METHOD, AND RECORDING MEDIUM

CROSS-REFERENCE TO RELATED APPLICATION

This patent application is based on and claims priority pursuant to 35 U.S.C. § 119(a) to Japanese Patent Application No. 2019-153482, filed on Aug. 26, 2019, in the Japan Patent Office, the entire disclosure of which is hereby incorporated by reference herein.

BACKGROUND

Technical Field

The present disclosure relates to acquiring a partial predetermined area from an image.

Related Art

An omnidirectional (360°) image capturing camera can capture an image of the entire circumference around the camera. If such a camera is used, the entire circumference of a room can be represented by a spherical (omnidirectional) image, which is suitable for introduction of a real estate property. The customer accesses a real estate introduction site from his/her own terminal and browses an image of the real estate property, thereby saving the time and effort of going to the property.

In addition, in the room, there is an object of interest (place) that the real estate agent particularly wants the customer to see. The object of interest is, for example, a new kitchen, a window having a large opening, a newly attached air conditioner, or the like. Therefore, conventionally, there is proposed a method of automatically specifying a plurality of areas of interest from a panoramic image by paying attention to a specific object in the panoramic image and cutting out images of the areas of interest.

SUMMARY

In an aspect of the present disclosure, there is provided an image processing apparatus configured to acquire an image that is a partial predetermined area of an image related to image data. The image processing apparatus includes processing circuitry configured to acquire a narrow-angle image that is a predetermined area of a wide-angle image, based on a structure of a building represented in the wide-angle image that is an entire region or a partial region of the image related to the image data.

In another aspect of the present disclosure, there is provided an image communication system that includes an image processing apparatus and a communication terminal. The image processing apparatus is configured to acquire an image that is a partial predetermined area of an image related to image data. The image processing apparatus includes processing circuitry configured to acquire a narrow-angle image that is a predetermined area of a wide-angle image, based on a structure of a building represented in the wide-angle image that is an entire region or a partial region of the image related to the image data. The communication terminal is configured to receive data of the narrow-angle image transmitted by the image processing apparatus and display the narrow-angle image.

In still another aspect of the present disclosure, there is provided a non-transitory recording medium storing computer readable program code for causing a computer to execute: acquiring a narrow-angle image that is a partial predetermined area of a wide-angle image, based on a structure of a building represented in the wide-angle image that is an entire region or a partial region of an image related to image data.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 1A is a left side view of an imaging apparatus;
FIG. 1B is a rear view of the imaging apparatus;
FIG. 1C is a plan view of the imaging apparatus;
FIG. 1D is a bottom view of the imaging apparatus;
FIG. 4A is a conceptual diagram illustrating a state in which a sphere is covered with an equirectangular projection image;
FIG. 4B is a diagram illustrating a spherical image;
FIG. 12 is a conceptual diagram of an image management table;
FIG. 14 is a conceptual diagram of an initial parameter management table;
FIGS. 15A and 15B are conceptual diagrams of cutout parameter management tables.

FIGS. 22A and 22B are diagrams illustrating examples of the composition of an image when a room looks beautiful, in which FIG. 22A illustrates a three-sided composition and FIG. 22B illustrates a two-sided composition;

FIG. 35 is a diagram illustrating a real estate introduction image.

Figure 2:
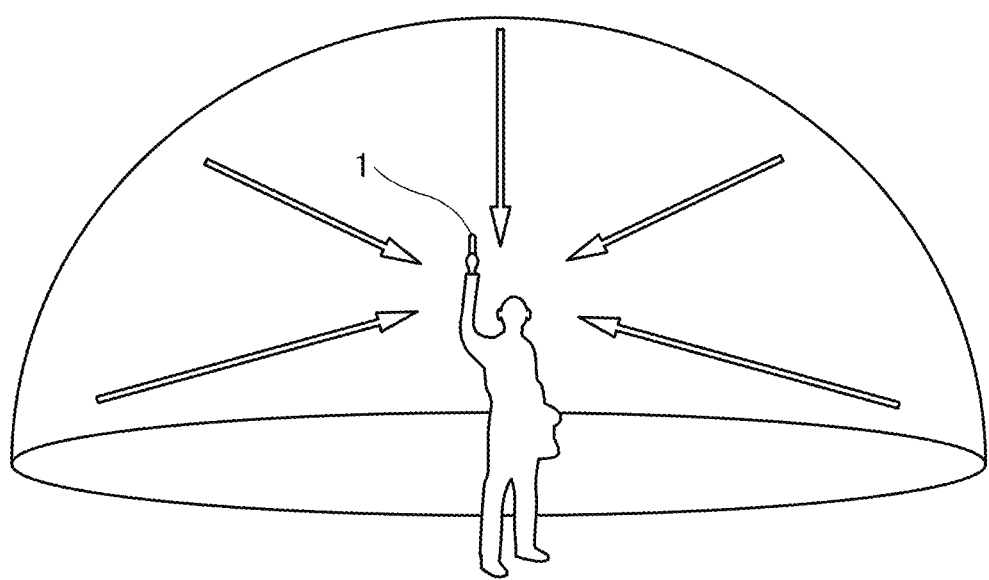
FIG. 2 is a diagram illustrating a picture of how the imaging apparatus is used, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments of the present disclosure are described with reference to the drawings.

Outline of Embodiment

Hereinafter, an outline of the present embodiment will be described.

First, a method of generating a spherical (omnidirectional) image will be described with reference to FIGS. 1 to 7.

First, an external appearance of an imaging apparatus 1 is described with reference to FIG. 1A, FIG. 1B, FIG. 1C, and FIG. 1D. The imaging apparatus 1 is a digital camera to obtain a captured image from which an omnidirectional (360°) panoramic image is generated. FIG. 1A is a left side view of the imaging apparatus. FIG. 1B is a rear view of the imaging apparatus. FIG. 1C is a plan view of the imaging apparatus. FIG. 1D is a bottom view of the imaging apparatus.

As illustrated in FIG. 1A, FIG. 1B, FIG. 1C, and FIG. 1D, a fish-eye lens 102a and a fish-eye lens 102b are disposed on the front side and the rear side, respectively, on the upper side of the imaging apparatus 1. Imaging elements (image sensors) 103a and 103b, which will be described later, are disposed inside the imaging apparatus 1, and a hemispherical image (with an angle of view of 180° or more) can be obtained by capturing an image of a subject or a landscape via the lenses 102a and 102b, respectively. A shutter release button 115a is arranged on the other side of the front side of the imaging apparatus 1. Moreover, a power switch 115b, a wireless fidelity (Wi-Fi) (registered trademark) key 115c, and a capturing-mode switching key 115d are arranged on a side of the imaging apparatus 1. Both the power switch 115b and the Wi-Fi key 115c are switched on and off every time the power switch 115b and the Wi-Fi key 115c are touched or pressed down. The capturing-mode switching key 115d is switched between a still-image capturing mode and a moving-image capturing mode every time the capturing-mode switching key 115d is touched or pressed down. Note that each of the shutter release button 115a, the power switch 115b, the Wi-Fi key 115c, and the capturing-mode switching key 115d is a part of the operation unit 115, and the operation unit 115 is not limited to these keys.

A tripod threaded hole 151, which is used to attach the imaging apparatus 1 to a tripod for cameras, is arranged in the center of the bottom 150 of the imaging apparatus 1. A micro universal serial bus (USB) (registered trademark) terminal 152 is arranged on the left side of the bottom 150. A high-definition multimedia interface (HDMI) terminal 153 is provided on the right end side of the bottom 150. HDMI is a registered trademark.

A situation in which the imaging apparatus 1 is used is described below with reference to FIG. 2. FIG. 2 is a diagram illustrating a picture of how the imaging apparatus is used, according to the present embodiment. As illustrated in FIG. 2, the imaging apparatus 1 is used, for example, by a user to hold the imaging apparatus 1 and capture an image of a subject around the user. In this case, the imaging element 103a and the imaging element 103b illustrated in FIG. 1 respectively capture images of the subject around the user, thereby obtaining two hemispherical images.

Figure 3A:
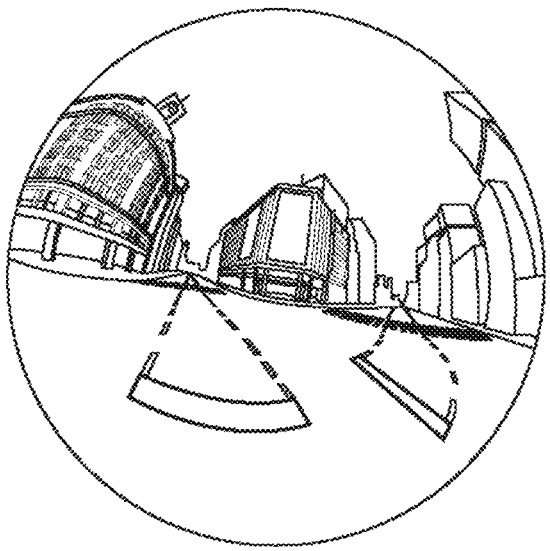
FIG. 3A is a diagram illustrating a hemispherical image (front side) captured by the imaging apparatus.
Figure 3B:
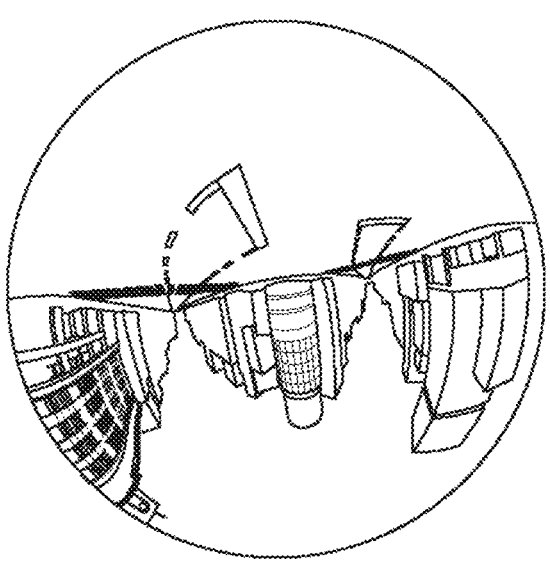
FIG. 3B is a diagram illustrating a hemispherical image side) captured by the imaging apparatus.
Figure 3C:
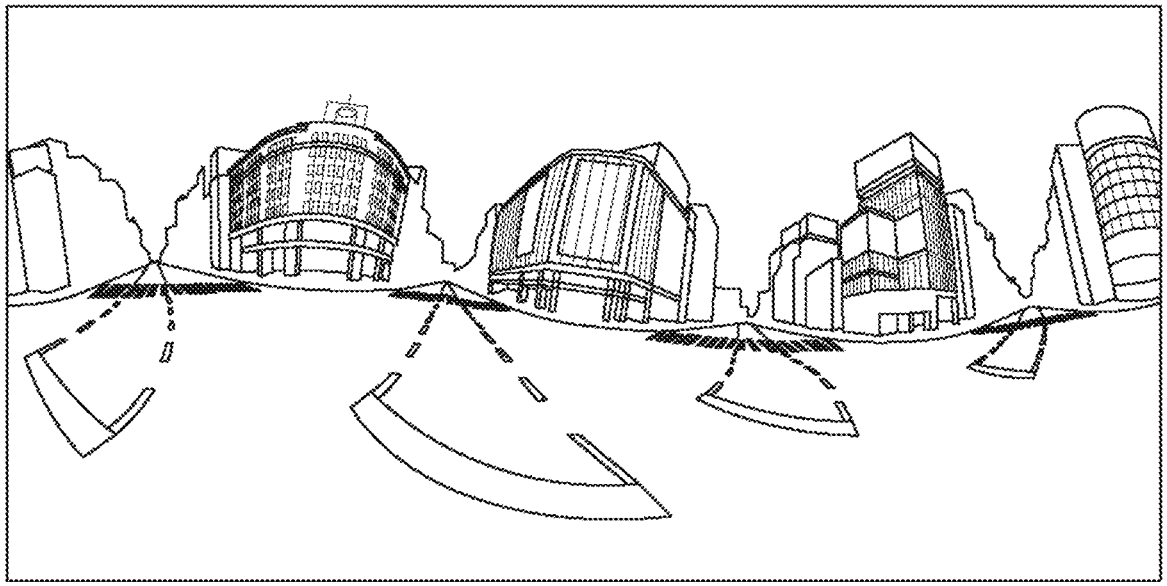
FIG. 3C is a diagram illustrating an image represented by an equirectangular projection method.

Next, processes in which an equidistant cylindrical projection image EC and a spherical image CE are generated from the images captured by the imaging apparatus 1 are schematically described with reference to FIG. 3A, FIG. 3B, FIG. 3C, FIG. 4A, and FIG. 4B. FIG. 3A is a diagram illustrating a hemispheric image (front side) captured by the imaging apparatus 1, according to the present embodiment. FIG. 3B is a diagram illustrating a hemispheric image (rear side) captured by the imaging apparatus 1, according to the present embodiment. FIG. 3C is a diagram illustrating an image drawn by the equidistant cylindrical projection, according to the present embodiment (such an image may be referred to as an equidistant cylindrical projection image in the following description). FIG. 4A is a diagram illustrating how an equidistant cylindrical projection image covers a sphere, according to the present embodiment. FIG. 4B is a diagram illustrating a spherical image according to the present embodiment. The equidistant cylindrical projection image is an example of a wide-angle image.

As illustrated in FIG. 3A, an image obtained by the imaging element 103a is a hemispherical image (front side) curved by the fish-eye lens 102a described below. As illustrated in FIG. 3B, an image obtained by the imaging element 103b is a hemispherical image (rear side) curved by the fish-eye lens 102b described below. The imaging apparatus 1 combines the hemispheric image (front side) and the hemispheric image (rear side) that is inverted by 180 degrees, to generate an equidistant cylindrical projection image EC as illustrated in FIG. 3C.

The imaging apparatus 1 uses OpenGL ES Open Graphics Library for Embedded Systems) to past the equirectangular projection image is pasted so as to cover the spherical surface as illustrated in FIG. 4A, and create the spherical image CE as illustrated in FIG. 4B. In this way, the spherical image CE is represented as an image in which the equirect-angular projection image EC faces the center of the sphere. Note that OpenGL ES is a graphics library used to visualize two-dimensional (2D) or three-dimensional (3D) data. The spherical image CE may be either of a still image or moving images.

As described above, since the spherical image CE is an image pasted so as to cover the spherical surface, a person feels a sense of discomfort. The imaging apparatus 1 displays a predetermined area that is part of the spherical image CE (such an image may be referred to as a predetermined-area image in the following description) as a planar image with little curvature, thus allowing display without giving a sense of discomfort to a person. This will be described with reference to FIGS. 5 and 6A and 6B.

Figure 5:
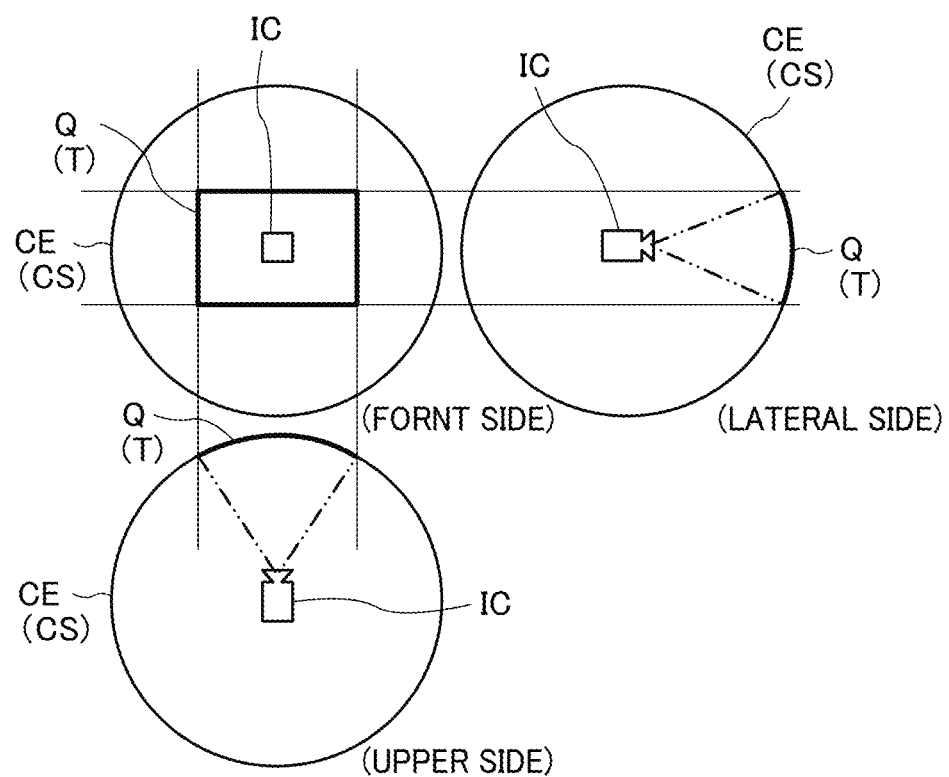
FIG. 5 is a diagram illustrating the positions of a virtual camera and a predetermined area when it is assumed that a spherical image is a three-dimensional sphere, according to an embodiment of the present disclosure.
Figure 6A:
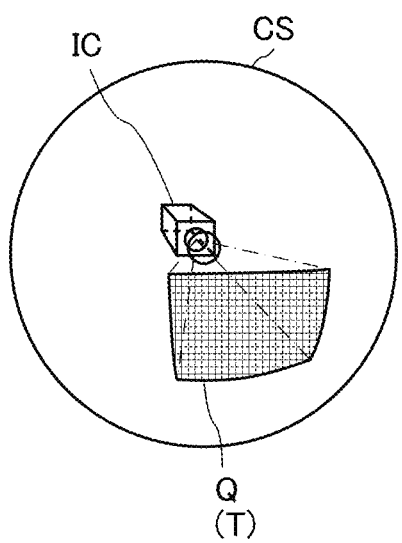
FIG. 6A is a three-dimensional perspective view of FIG. 5.
Figure 6B:
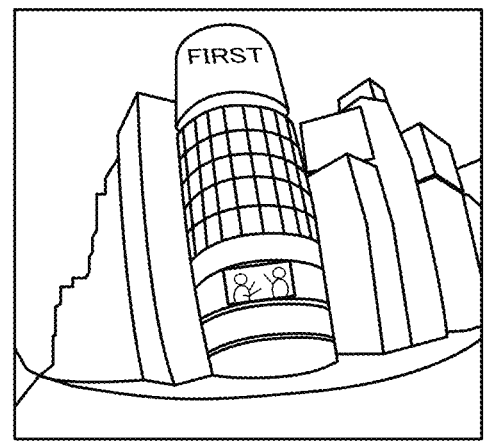
FIG. 6B is a diagram illustrating a state in which an image of a predetermined area is displayed on a display of a communication terminal.

FIG. 5 is a diagram illustrating the positions of a virtual camera and a predetermined area when it is assumed that a spherical image is a three-dimensional sphere, according to an embodiment of the present disclosure. The virtual camera IC indicates the location of the eyepoint of a user who sees the spherical image CE that is displayed as a three-dimensional sphere. FIG. 6A is a three-dimensional perspective view of the three-dimensional sphere of FIG. 5. FIG. 6B is a diagram illustrating a state in which a predetermined-area image Q is displayed on a display, according to the present embodiment. In FIG. 6A, the spherical image CE illustrated in FIG. 4B is represented by a three-dimensional sphere CS. When it is assumed that the spherical image CE as generated above is the sphere CS, as illustrated in FIG. 5, the virtual camera IC is placed inside the spherical image GE. The predetermined area T in the spherical image CE is an imaging area of the virtual camera IC and is determined by the predetermined-area information indicating the capturing direction and the angles of view of the virtual camera IC in the three-dimensional virtual space including the spherical image CE.

A predetermined-area image Q illustrated in FIG. 6A is displayed on a particular display device as an image in the imaging area of the virtual camera IC as illustrated in FIG. 6B. The image illustrated in FIG. 6B is an image of the predetermined area indicated by the predetermined-area information in the initial settings (default). Further description is given below with reference to the capturing directions (θ, φ) and the angle of view (α) of the virtual camera IC. The imaging direction is also referred to as a line-of-sight direction.

Figure 7:
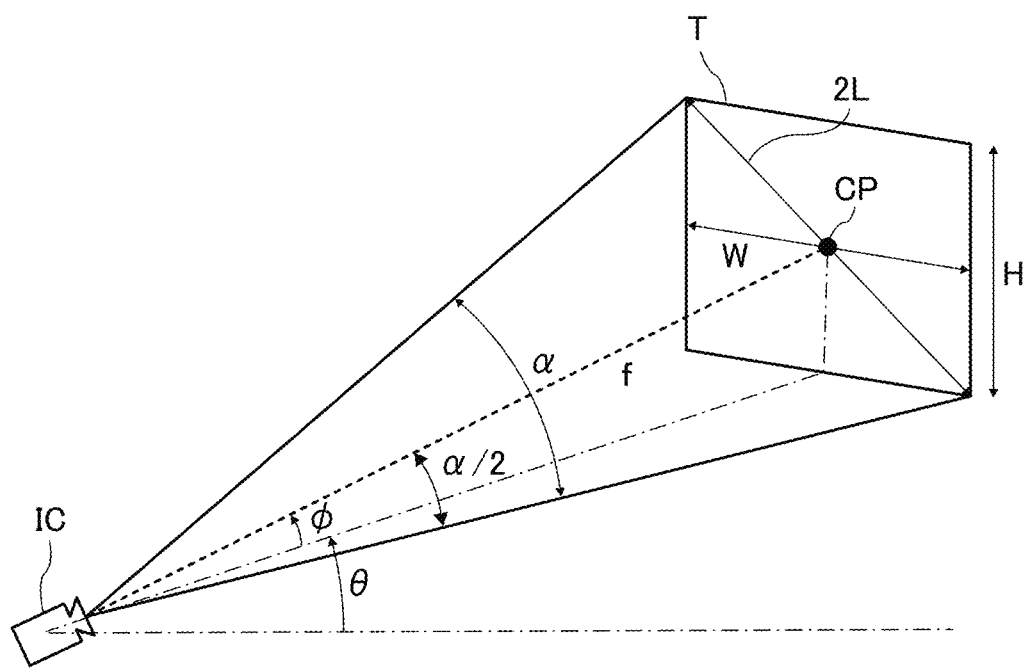
FIG. 7 is a diagram illustrating the relation between predetermined-area information and an image in a predetermined region T, according to an embodiment of the present disclosure.

The relation between predetermined-area information and the image in the predetermined area T is described below with reference to FIG. 7. FIG. 7 is a diagram illustrating the relation between predetermined-area information and the image in the predetermined area T, according to the present embodiment. As illustrated in FIG. 7, "θ" denotes a pan angle in the imaging direction of the virtual camera IC, "φ" denotes a tilt angle in the imaging direction of the virtual camera IC, and "α" denotes an angle of view. Further, "W" represents the width of the predetermined area T, and "H" represents the height of the predetermined area H. That is, the posture of the virtual camera IC is changed such that the observation point of the virtual camera IC indicated by the imaging directions (θ, φ) matches the center point CP of a predetermined area T that is an imaging area of the virtual camera IC. The predetermined-area image Q is an image of the predetermined area T in the spherical image CE, and "f" denotes the distance between the virtual camera IC and the center point CP. The reference code "L" is a distance between an arbitrary vertex of the predetermined area T and the center point CP (2L is a diagonal line). In FIG. 7, a trigonometric function generally expressed by the following Formula 1 is established.

$$L/f=\tan(\alpha/2) \qquad \text{(Formula 1)}$$

Outline of Image Communication System

Figure 8:
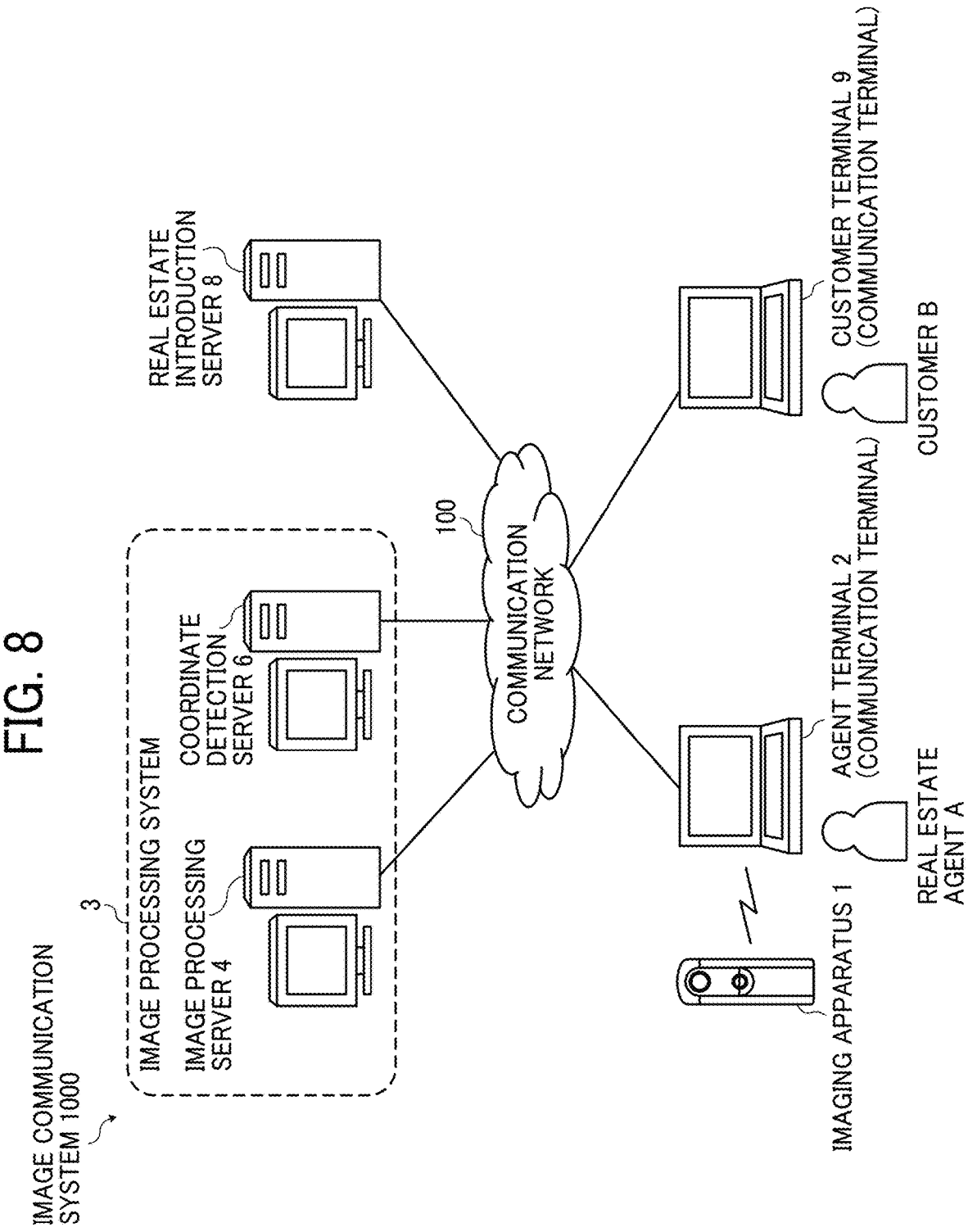
FIG. 8 is a schematic diagram of an image communication system.

An outline of the configuration of an image communication system according to the present embodiment is described with reference to FIG. 8. FIG. 8 is a schematic diagram of a configuration of the image communication system according to the present embodiment.

As illustrated in FIG. 8, an image communication system 1000 according to the present embodiment includes the imaging apparatus 1, an agent terminal 2, an image processing server 4, a coordinate detection server 6, a real estate introduction server 8, and a customer terminal 9.

The agent terminal 2, the image processing server 4, the coordinate detection server 6, the real estate introduction server 8, and the customer terminal 9 are communicably connected via a communication network such as the Internet. The imaging apparatus 1 is connected to the agent terminal 2 via a cable such as a universal serial bus (USB) cable or a high-definition multimedia interface (HDMI) cable.

As described above, the imaging apparatus 1 is a special digital camera for capturing images of a subject, a landscape, or the like to obtain two hemispherical images from which an equirectangular projection image is generated. Note that the imaging apparatus according to an embodiment of the present disclosure may be an imaging apparatus (a single-lens reflex camera, a compact digital camera, a smartphone, a tablet PC, or the like) for obtaining a general wide-angle planar image instead of an equirectangular projection image, but in the present embodiment, a case of a digital camera for obtaining an equirectangular projection image will be mainly described. Here, the wide-angle image is generally an image captured using a wide-angle lens, and is an image captured using a lens capable of capturing an image in a range wider than a range perceived by human eyes. The wide-angle image also generally means an image captured with a lens having a focal length of 35 mm or less in terms of 35 mm film.

The agent terminal 2 is a personal computer (PC) used by a real estate dealer A. The agent terminal 2 is an example of a communication terminal. Note that the imaging apparatus 1 and the agent terminal 2 may wirelessly communicate with each other using a short-range wireless communication technology such as Wi-Fi, Bluetooth (registered trademark), or near field communication (NFC) without using the cable.

The image processing server 4 is a server owned by a first company that provides a service to the real estate agent A.

The coordinate detection server 6 is a server owned by the first company that provides a service to the real estate agent A or a second company that provides a service to the first company. The image processing server 4 and the coordinate detection server 6 constitute an image processing system 3.

The real estate introduction server 8 is a server owned by the real estate agent A or a third company that provides a service to the real estate agent A. The real estate introduction server 8 manages data of a real estate introduction image as illustrated in FIG. 35.

The customer terminal 9 is a PC used by a customer B of the real estate agent A. The customer B accesses the site of the real estate introduction server 8 using the customer terminal 9 to acquire the data of the real estate introduction image illustrated in FIG. 35 and displays the real estate introduction image by a web browser. Thus, the customer B can browse the real estate introduction image.

Hardware Configuration According to Embodiment

Next, with reference to FIGS. 9 and 10, the hardware configurations of the imaging apparatus 1, the communication terminals (the agent terminal 2 and the customer terminal 9), and the servers (the image processing server 4, the coordinate detection server 6, and the real estate introduction server 8) according to the present embodiment will be described in detail.

Hardware Configuration of Imaging Apparatus

First, the hardware configuration of the imaging apparatus 1 will be described with reference to FIG. 9. FIG. 9 is a diagram illustrating a hardware configuration of the imaging apparatus 1. In the following description, the imaging apparatus 1 is assumed to be a spherical (omnidirectional) imaging apparatus using two imaging elements. However, the number of imaging elements may be two or more.

Further, the imaging apparatus is not always needed to be an apparatus dedicated to omnidirectional imaging. For example, an omnidirectional imaging unit may be retrofitted to any known digital camera or agent terminal so as to substantially achieve the same functions as the imaging apparatus 1.

Figure 9:
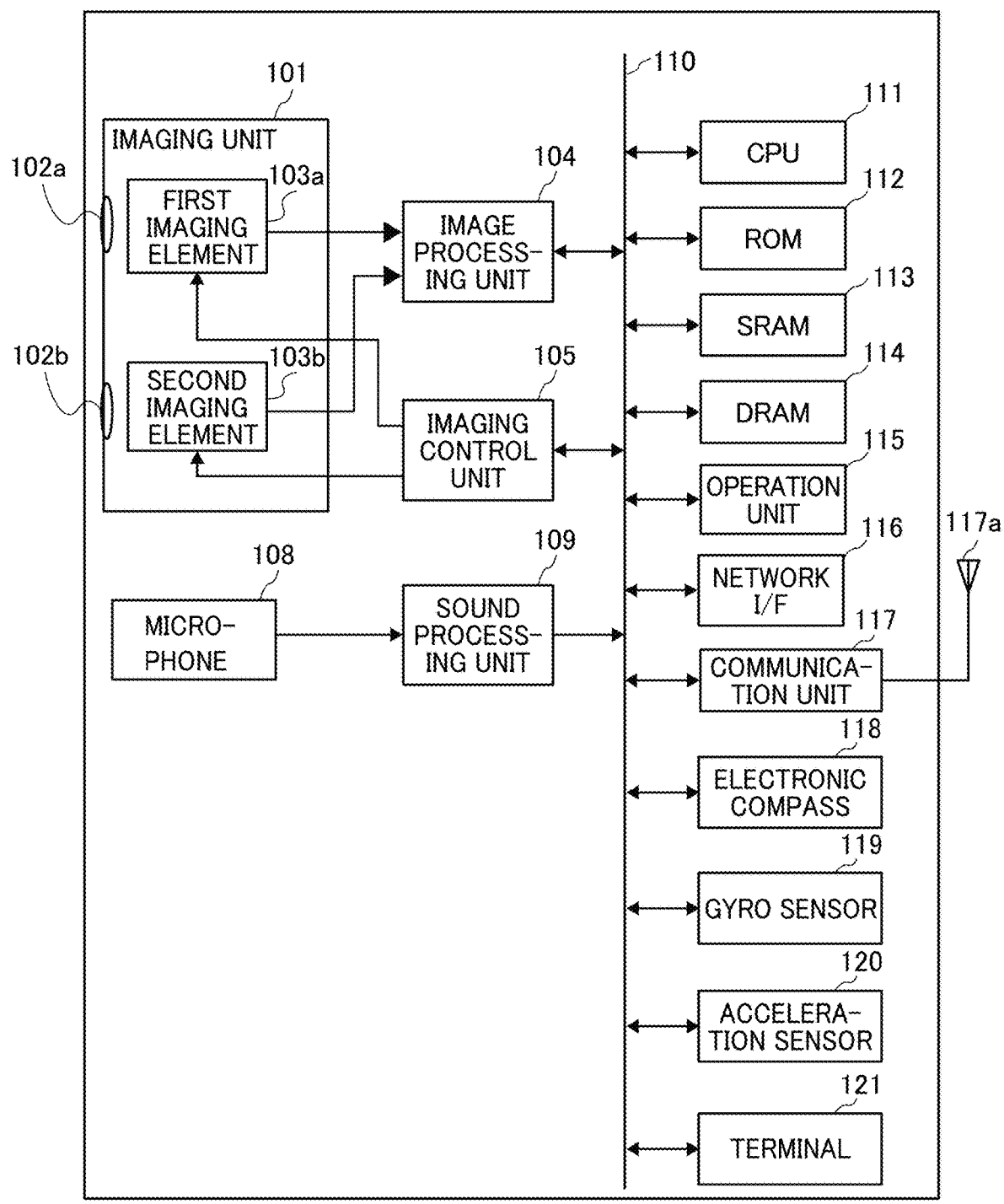
FIG. 9 is a diagram illustrating a hardware configuration of the imaging apparatus.

As illustrated in FIG. 9, the imaging apparatus 1 includes an imaging unit 101, an image processing unit 104, an imaging control unit 105, a microphone 108, a sound processing unit 109, a central processing unit (CPU) 111, a read only memory (ROM) 112, a static random access memory (SRAM) 113, a dynamic random access memory (DRAM) 114, an operation unit 115, a network interface (I/F) 116, a communication unit 117, an antenna 117a, an electronic compass 118, a gyro sensor 119, an acceleration sensor 120, and a terminal 121.

The imaging unit 101 includes wide-angle lenses (so-called fish-eye lenses) 102a and 102b each of which has an angle of view equal to or wider than 180° and forms a hemispheric image, and a pair of imaging elements 103a and 103b that are assigned to the wide-angle lenses 102a and 102b, respectively. For example, each of the imaging elements 103a and 103b includes an image sensor such as a complementary metal oxide semiconductor (CMOS) sensor and a charge coupled device (CCD) sensor, which converts the optical images by the fish-eye lenses 102a and 102b into image data of electrical signals and output the obtained image data, a timing generating circuit that generates, for example, a horizontal synchronizing signal or vertical synchronizing signal of the image sensor and a pixel clock signal of the image sensor, and a group of registers in which, for example, various kinds of commands or parameters for operating the imaging elements 103a and 103b are set.

The imaging elements 103a and 103b of the imaging unit 103 are connected to the image processing unit 104 via a parallel I/F bus. The imaging elements 103a and 103b of the imaging unit 101 are also connected to the imaging control unit 105 via a serial bus (I2C bus or the like). The image processing unit 104, the imaging control unit 105, and the sound processing unit 109 are connected to the CPU 111 via a bus 110. The ROM 112, the SRAM 113, the DRAM 114, the operation unit 115, the network I/F 116, the communication unit 117, the electronic compass 118, and the like are also connected to the bus 110.

The image processing unit 104 takes in the image data output from the imaging elements 103a and 103b through the parallel I/F bus, performs predetermined processing on the respective image data, and then performs synthesis processing on the image data to create data of an equirectangular projection image as illustrated in FIG. 3C.

The imaging control unit 105 uses the I2C bus to set, for example, commands to the group of registers of the imaging elements 103a and 103b, where typically the imaging control unit 105 serves as a master device and the imaging elements 103a and 103b serve as a pair of slave devices. The commands or the like set herein are received from the CPU 111. In a similar manner, the imaging control unit 105 uses the I2C bus to take in, for example, the status data of the group of registers of the imaging elements 103a and 103b, and sends the obtained data to the CPU 111.

The imaging control unit 105 instructs the imaging elements 103a and 103b to output image data at the timing when the shutter button of the operation unit 115 is touched or pressed down. The imaging apparatus 1 may have a preview display function or a function of displaying a movie on a display (for example, the display 517 of the agent terminal 2). In such a case, the image data is continuously output from the imaging elements 103a and 103b at a predetermined frame rate (frames/minute).

As will be described later in detail, the imaging control unit 105 may also serve as a synchronous control unit that synchronizes the timing at which the image data is output from the imaging element 103a with the timing at which the image data is output from the imaging element 103b, in cooperation with the CPU 111. In the present embodiment, the imaging apparatus 1 is not provided with a display. However, no limitation is indicated thereby, and the imaging apparatus 1 may be provided with a display unit.

The microphone 108 converts picked-up sound into audio (signal) data. The sound processing unit 109 takes in the audio data output from the microphone 108 through the I/F bus and performs predetermined processing on the audio data.

The CPU 111 controls the overall operation of the imaging apparatus 1 and executes necessary processing. The ROM 112 stores various programs for the CPU 111. Each of the SRAM 113 and the DRAM 114 serves as working memory, and stores, for example, a program to be executed by the CPU 111 and the data that is being processed. In particular, the DRAM 114 stores the image data that is being processed by the image processing unit 104 or the data of equidistant cylindrical projection image that has been processed.

Operation keys such as the shutter release button 115a are collectively referred to as the operation unit 115. For example, a user can specify various kinds of imaging modes or input various kinds of imaging conditions by operating the operation unit 115.

Interface circuits (e.g., an USB interface) with an external medium such as secure digital (SD) card and an external device such as a personal computer (PC) are collectively referred to as the network I/F 116. The network I/F 116 may be a wireless or wired interface. The data of the equirectangular projection image stored in the DRAM 114 is recorded in an external medium via the network I/F 116 or is transmitted to an external terminal (apparatus) such as the agent terminal 2 via the network I/F 116 as necessary.

The communication unit 117 communicates with an external terminal (apparatus) such as the agent terminal 2 via the antenna 117a provided in the imaging apparatus 1 by a short-range wireless communication technology such as Wi-Fi, NFC, or Bluetooth. The communication unit 117 can also transmit the equirectangular projection image data to an external terminal (apparatus) such as the agent terminal 2.

The electronic compass 118 calculates the orientation of the imaging apparatus 1 from the earth's magnetism and outputs orientation information. The orientation information is an example of related information (metadata) according to Exif and is used for image processing such as image correction of a captured image. The related information includes items of data including the shooting date and time of a captured image and the data size of the image data.

The gyro sensor 119 is a sensor that detects a change in angle (roll angle, pitch angle, and yaw angle) caused by the movement of the omnidirectional camera 20. The change in angle is an example of the related information (metadata) according to Exif and is used for image processing such as image correction of a captured image.

The acceleration sensor 120 is a sensor that detects accelerations in three axial directions. The imaging apparatus 1 calculates the posture (angle with respect to the gravity direction) of the imaging apparatus 1 based on the acceleration detected by the acceleration sensor 120. Providing both the gyro sensor 119 and the acceleration sensor 120 in the imaging apparatus 1 enhances the accuracy of image correction.

The terminal 121 is a concave terminal for micro USB.

Hardware Configuration of Communication Terminals and Servers

Next, with reference to FIG. 10, the hardware configurations of the communication terminals (the agent terminal 2 and the customer terminal 9) and the servers (the image processing server 4, the coordinate detection server 6, and the real estate introduction server 8) will be described in detail. FIG. 10 is a diagram illustrating hardware configurations of the communication terminals and the servers in the present embodiment.

As illustrated in HG. 10, the agent terminal 2 includes a CPU 201, a ROM 202, a random access memory (RAM) 203, a hard disk (HD) 204, a hard disk drive (HDD) controller 205, a recording medium 206, a media I/F 207, a display 208, a communication connection mechanism 209, a network I/F 210, a keyboard 211, a mouse 212, a digital versatile disc-rewritable (DVD-RW) drive 214, and a bus line 220.

Among them, the CPU 201 controls the entire operation of the agent terminal 2. The ROM 202 stores a program used for driving the CPU 201. The RAM 203 is used as a working area of the CPU 201. The HD 204 stores various data such as programs. The HDD controller 205 controls reading or writing of various data from or to the HD 204 under the control of the CPU 201. The media I/F 207 controls reading or writing (storing) of data from or to a recording medium 206 such as a flash memory or the like. The display 208 displays various types of information such as a cursor, a menu, a window, characters, or an image. The communication connection mechanism 209 includes a connection port for USB, HDMI, or the like. The network I/F 210 is an interface for performing data communication using the communication network 100. The keyboard 211 is one example of input device provided with a plurality of keys for allowing a user to input characters, numerals, or various instructions. The mouse 212 is one example of input device for selecting or executing various kinds of instructions, selecting an object to be processed, or for moving a cursor. The DVD-RW drive 214 controls reading or writing of various data from or to a DVD-RW 213 as an example of a removable storage medium.

The image processing server 4 includes a CPU 401, a ROM 402, a RAM 403, an HD 404, an HDD controller 405, a recording medium 406, a media I/F 407, a display 408, a communication connection mechanism 409, a network I/F 410, a keyboard 411, a mouse 412, a DVD-RW drive 414, and a bus line 420. These components are similar in configuration to the CPU 201, the ROM 202, the RAM 203, the HD 204, the HDD controller 205, the recording medium 206, the media I/F 207, the display 208, the communication connection mechanism 209, the network I/F 210, the keyboard 211, the mouse 212, the DVD-RW drive 214, and the bus line 220, respectively, and hence descriptions thereof are omitted.

The coordinate detection server 6 includes a CPU 601, a ROM 602, a RAM 603, an HD 604, an HDD controller 605, a recording medium 606, a media I/F 607, a display 608, a communication connection mechanism 609, a network I/F 610, a keyboard 611, a mouse 612, a DVD-RW drive 614, and a bus line 620. These components are similar in configuration to the CPU 201, the ROM 202, the RAM 203, the HD 204, the HDD controller 205, the recording medium 206, the media I/F 207, the display 208, the communication connection mechanism 209, the network I/F 210, the keyboard 211, the mouse 212, the DVD-RW drive 214, and the bus line 220, respectively, and hence descriptions thereof are omitted.

The real estate introduction server 8 includes a CPU 801, a ROM 802, a RAM 803, an HD 804, an HDD controller 805, a recording medium 806, a media I/F 807, a display 808, a communication connection mechanism 809, a network I/F 810, a keyboard 811, a mouse 812, a DVD-RW drive 814, and a bus line 820. These components are similar in configuration to the CPU 201, the ROM 202, the RAM 203, the HD 204, the HDD controller 205, the recording medium 206, the media I/F 207, the display 208, the communication connection mechanism 209, the network I/F 210, the keyboard 211, the mouse 212, the DVD-RW drive 214, and the bus line 220, respectively, and hence descriptions thereof are omitted.

The customer terminal 9 includes a CPU 901, a ROM 902, a RAM 903, an HD 904, an HDD controller 905, a recording medium 906, a media I/F 907, a display 908, a communication connection mechanism 909, a network 910, a keyboard 911, a mouse 912, a DVD-RW drive 914, and a bus line 920. These components are similar in configuration to the CPU 201, the ROM 202, the RAM 203, the HD 204, the HDD controller 205, the recording medium 206, the media I/F 207, the display 208, the communication connection mechanism 209, the network I/F 210, the keyboard 211, the mouse 212, the DVD-RW drive 214, and the bus line 220, respectively, and hence descriptions thereof are omitted.

Instead of the DVD-RW drive, a Blu-ray Disc drive or the like may be used. The communication terminals (the agent terminal 2 and the customer terminal 9) and the servers (the image processing server 4, the coordinate detection server 6, and the real estate introduction server 8) may each be constructed by a single computer, or may be constructed by a plurality of computers to which each unit (function, means, or storage unit) is divided and arbitrarily assigned. Furthermore, a recording medium such as an HD or a DVD-ROM in which each of the above programs is stored can be provided domestically or abroad as a program product.

Functional Configuration of Embodiment

Next, the functional configuration of the present embodiment is described with reference to FIGS. 10 to 15B. FIG. 11 is a functional block diagram of the image communication system 1000. Here, since the imaging apparatus 1, the real estate introduction server 8, and the customer terminal 9 do not perform characteristic processing, descriptions thereof are omitted.

Functional Configuration of Agent Terminal

First, the functional configuration of the agent terminal 2 is described in detail with reference to FIGS. 10 and 11. As illustrated in FIG. 11, the agent terminal 2 includes a transmitting-and-receiving unit 21, a receiving unit 22, a creating unit 23, a display control unit 24, a determination unit 25, a communication unit 28, and a storing-and-reading unit 29. Each of the above-described units is implemented by any of the components illustrated in FIG. 10 operating in response to an instruction from the CPU 201 according to a program for the agent terminal 2 loaded from the HD 204 onto the RAM 203.

Figure 10:
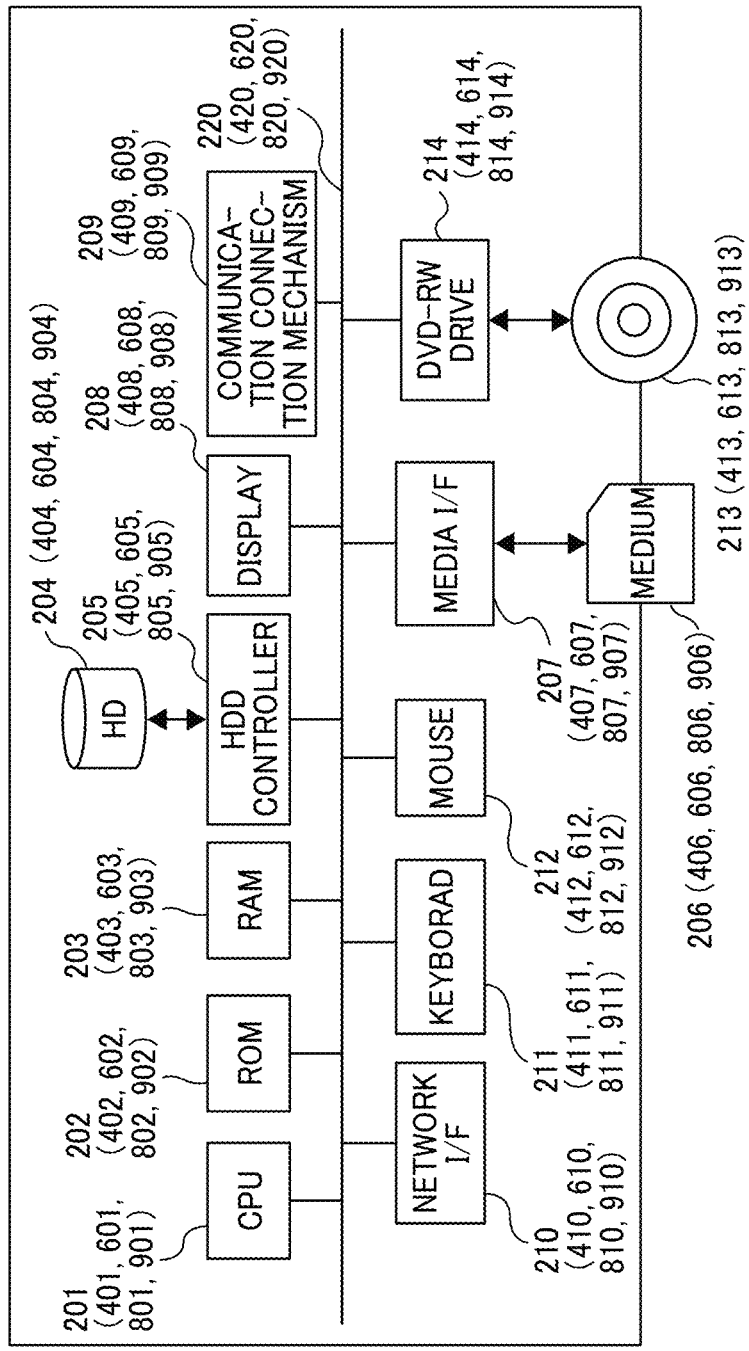
FIG. 10 is a diagram illustrating a hardware configuration of a communication terminal and a server.
Figure 11:
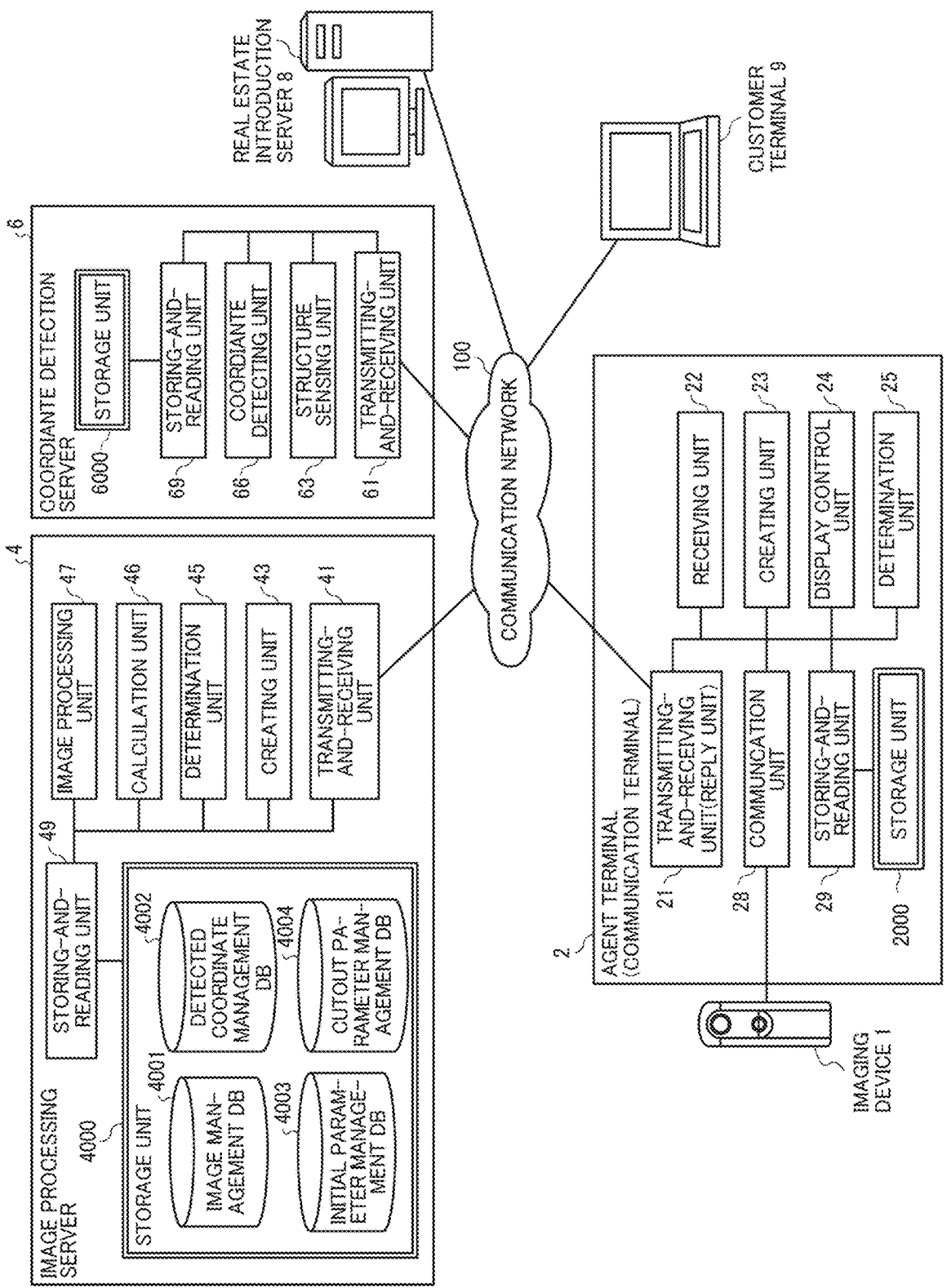
FIG. 11 is a functional block diagram of an image communication system.

The agent terminal 2 further includes a storage unit 2000 configured by the RAM 203 and the HD 204 illustrated in FIG. 10.

Functional Configurations of Agent Terminal

The transmitting-and-receiving unit 21 is mainly implemented by the processing of the network I/F 210 and the CPU 201 illustrated in FIG. 10, and transmits and receives various data (or information) to and from other devices (for example, the imaging apparatus 1, the image processing server 4, and the real estate introduction server 8) via the communication network 100 such as the Internet. The transmitting-and-receiving unit 21 also functions as a reply unit to perform processing to reply to the image processing server 4.

The receiving unit 22 is mainly implemented by the processing of the keyboard 211, the mouse 212, and the CPU 201, and receives various selections or inputs from the user (real estate agent A).

The creating unit 23 is mainly implemented by the processing of the CPU 201 and creates a real estate introduction image as illustrated in FIG. 35.

The display control unit 24 is mainly implemented by the processing of the CPU 201 and displays various images on the display 208.

The determination unit 25 is mainly implemented by the processing of the CPU 201 and performs various determinations. The determination will be described later.

The communication unit 28 is mainly implemented by the communication connection mechanism 209 and the processing of the CPU 201 and performs communication of image data and the like by connecting a communication cable to an external apparatus (for example, the imaging apparatus 1).

The storing-and-reading unit 29 is mainly implemented by the processing of the HDD controller 205 and the CPU 201, and stores various data (or information) in the storage unit 2000 and reads various data (or information) from the storage unit 2000.

Functional Configuration of Image Processing Server

Next, the functional configuration of the image processing server 4 is described in detail with reference to FIGS. 10 and 11. As illustrated in FIG. 11, the image processing server 4 includes a transmitting-and-receiving unit 41, a creating unit 43, a determination unit 45, a calculation unit 46, an image processing unit 47, and a storing-and-reading unit 49. Each of these units is implemented by operating any of the components illustrated in FIG. 10 in response to an instruction from the CPU 401 according to a program for the image processing server 4 loaded from the HD 404 onto the RAM 403.

The image processing server 4 further includes a storage unit 4000 configured by the RAM 403 and the HD 404 illustrated in FIG. 10. The storage unit 4000 includes an image management database (DB) 4001, a detected coordinate management DB 4002, an initial parameter management DB 4003, and a cutout parameter management DB 4004.

Image Management Table

FIG. 12 is a conceptual diagram of an image management table constituting the image management DB 4001. In the image management table, an image identification (ID) for identifying a wide-angle image and a narrow-angle image and image data are managed in association with each other. The narrow-angle image is a predetermined area image as a partial image of the wide-angle image.

Detected Coordinate Management Table

Figures 13A, 13B:
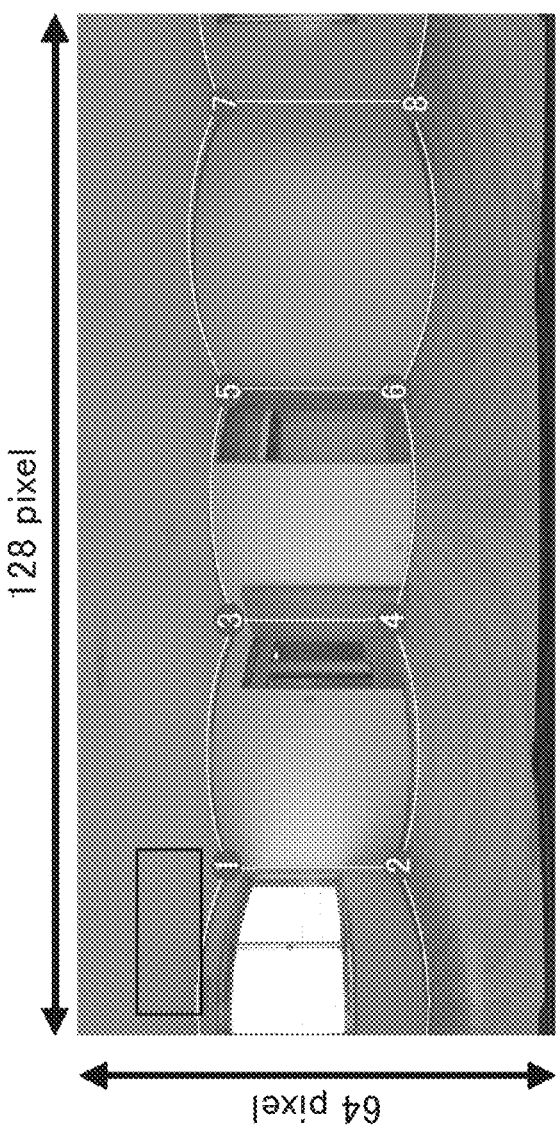
FIG. 13A is a conceptual diagram of a detected coordinate management table.
FIG. 13B is a conceptual diagram of a wide-angle image indicating positions corresponding to intersection coordinates of FIG. 13A.

FIG. 13A is a conceptual diagram of a detected coordinate management table constituting the detected coordinate management DB 4002. FIG. 13B is a conceptual diagram of a wide-angle image indicating positions corresponding to the intersection coordinates of FIG. 13A. In the detected coordinate management table, the intersection coordinates of the wide-angle image detected by the coordinate detection server 6 are managed for each image ID (for example, Room 1) of the wide-angle image.

The intersection coordinates indicate coordinates of intersections of boundary lines of building such as walls, ceilings, and floors in the wide-angle image. Here, intersections of boundaries in a wide-angle image having a length of 64 pixels and a width of 128 pixels, that is, coordinates of corners of a room on the image are illustrated. The numbers of eight intersection coordinates in the detected coordinate management table correspond to the numbers of the eight positions (coordinates) illustrated on the wide-angle image illustrated in FIG. 13B.

Initial Parameter Management Table

FIG. 14 is a conceptual diagram of an initial parameter management table constituting the initial parameter management DB 4003. In the initial parameter management table, initial parameters and designated parameters are managed in association with five types of parameters. The five types are the angle of view α, the pan angle θ, the tilt angle φ, the height H, and the width W described in FIG. 7.

The initial parameters are parameters registered in advance before factory shipment or the like. The designated parameters are parameters designated by the user (real estate agent A).

Cutout Parameter Management Table

FIGS. 15A and 15B are conceptual diagrams of cutout parameter management tables constituting the cutout parameter management DB 4004. FIG. 15A illustrates the cutout parameter management table at the first stage. FIG. 15B illustrates the cutout parameter management table in which adjustment values are added.

In the cutout parameter management table, the image ID of the wide-angle image (for example, room 1), the image ID of the narrow-angle image (for example, crop 01), and the cutout mode (for example, a1) are associated with each other. There are three types of cutout modes, including a cutout mode 1 (a1) indicating a narrow-angle image cut out using the structure and the importance, a cutout mode 2 (a2) indicating a narrow-angle image cut out using only the structure, and a cutout mode (a3) indicating a narrow-angle image cut out using the importance. The structure and importance will be described later.

Further, in the cutout parameter management table, for each set of parameters including the image ID of the wide-angle image, the image ID of the narrow-angle image, and the cutout mode, the cutout parameter and the adjustment value are managed in association with the above-described five types of parameters. The cutout parameter is calculated by the calculation unit 46 and is used for the processing of cutting out a narrow-angle image from a wide-angle image on the side of the agent terminal 2. The adjustment value is a value that is used to adjust the cutout parameter once calculated. When there is an adjustment value, the cutout parameter and the adjustment value are used in the processing of cutting out the narrow-angle image from the wide-angle image on the side of the agent terminal 2.

Functional Configuration of Image Processing Server

The transmitting-and-receiving unit 41 is mainly implemented by the processing of the network I/F 410 and the CPU 401 illustrated in FIG. 10, and transmits and receives various data (or information) to and from other devices (for example, the agent terminal 2 and the coordinate detection server 6) via the communication network 100 such as the Internet.

The creating unit 43 is mainly implemented by the processing of the CPU 401 and creates an image ID (for example, crop 01) for identifying a narrow-angle image to be cut out from a wide-angle image. Further, the creating unit 43 creates a uniform resource locator (URL) including an image ID so that the agent terminal 2 can acquire data of a wide-angle image managed by the image processing server 4.

The determination unit 45 is mainly implemented by the processing of the CPU 401 and performs various determinations. The determination will be described later.

The calculation unit 46 is mainly implemented by the processing of the CPU 401 and calculates the angle of view α, the pan angle θ, and the tilt angle φ based on a predetermined algorithm using the intersection coordinates.

The image processing unit 47 is mainly implemented by the processing of the CPU 401 and performs image processing such as cutting out each wide-angle image indicating, for example, two types of compositions (three-sided composition and two-sided composition), which will be described later with reference to FIG. 22. Specifically, the image processing unit 47 cuts out and acquires the narrow-angle image so as to include a specific boundary having the shortest length in the vertical direction in the wide-angle image among a plurality of boundaries representing the structure of the building in the wide-angle image.

The storing-and-reading unit 49 is mainly implemented by the processing of the HDD controller 405 and the CPU 401, and stores various data (or information) in the storage unit 4000 and reads various data (or information) from the storage unit 4000.

Functional Configuration of Coordinate Detection Server

Next, the functional configuration of the coordinate detection server 6 is described in detail with reference to FIGS. 10 and 11. As illustrated in FIG. 11, the coordinate detection server 6 includes a transmitting-and-receiving unit 61, a structure sensing unit 63, a coordinate detection unit 66, and a storing-and-reading unit 69. Each of these units is implemented by operating any of the components illustrated in FIG. 10 by an instruction from the CPU 601 according to a program for the coordinate detection server 6 loaded from the HD 604 onto the RAM 603.

The coordinate detection server 6 further includes a storage unit 6000 configured by the RAM 603 and the HD 604 illustrated in FIG. 10.

Functional Configuration of Coordinate Detection Server

The transmitting-and-receiving unit 61 is mainly implemented by the processing of the network I/F 610 and the CPU 601 illustrated in FIG. 10, and transmits and receives various data (or information) to and from another apparatus (for example, the image processing server 4) via the communication network 100 such as the Internet.

The structure sensing unit 63 is mainly implemented by the processing of the CPU 401 and detects the structure of the room from the wide-angle image. Specifically, the structure sensing unit 63 estimates boundary information indicating boundaries between a wall, a ceiling, and a floor from the wide-angle image. This estimation is performed by machine learning, image processing, and the like. The boundary information is a collection of coordinates indicating boundary lines in the entire image including the intersection coordinates in FIG. 13A, and indicates, for example, vertical straight lines and horizontal curved lines illustrated in FIG. 20 described later.

The coordinate detection unit 66 is mainly implemented by the processing of the CPU 401, and detects respective intersection coordinates as illustrated in FIGS. 13A and 13B based on boundary information indicating boundary lines between a wall, a ceiling, and a floor, which will be described later, illustrated in FIG. 20.

The storing-and-reading unit 69 is mainly implemented by the processing of the HDD controller 605 and the CPU 601, and stores various data (or information) in the storage unit 6000 and reads various data (or information) from the storage unit 6000.

Processing or Operation of Embodiment

Management of Wide-angle Image

Figure 16:
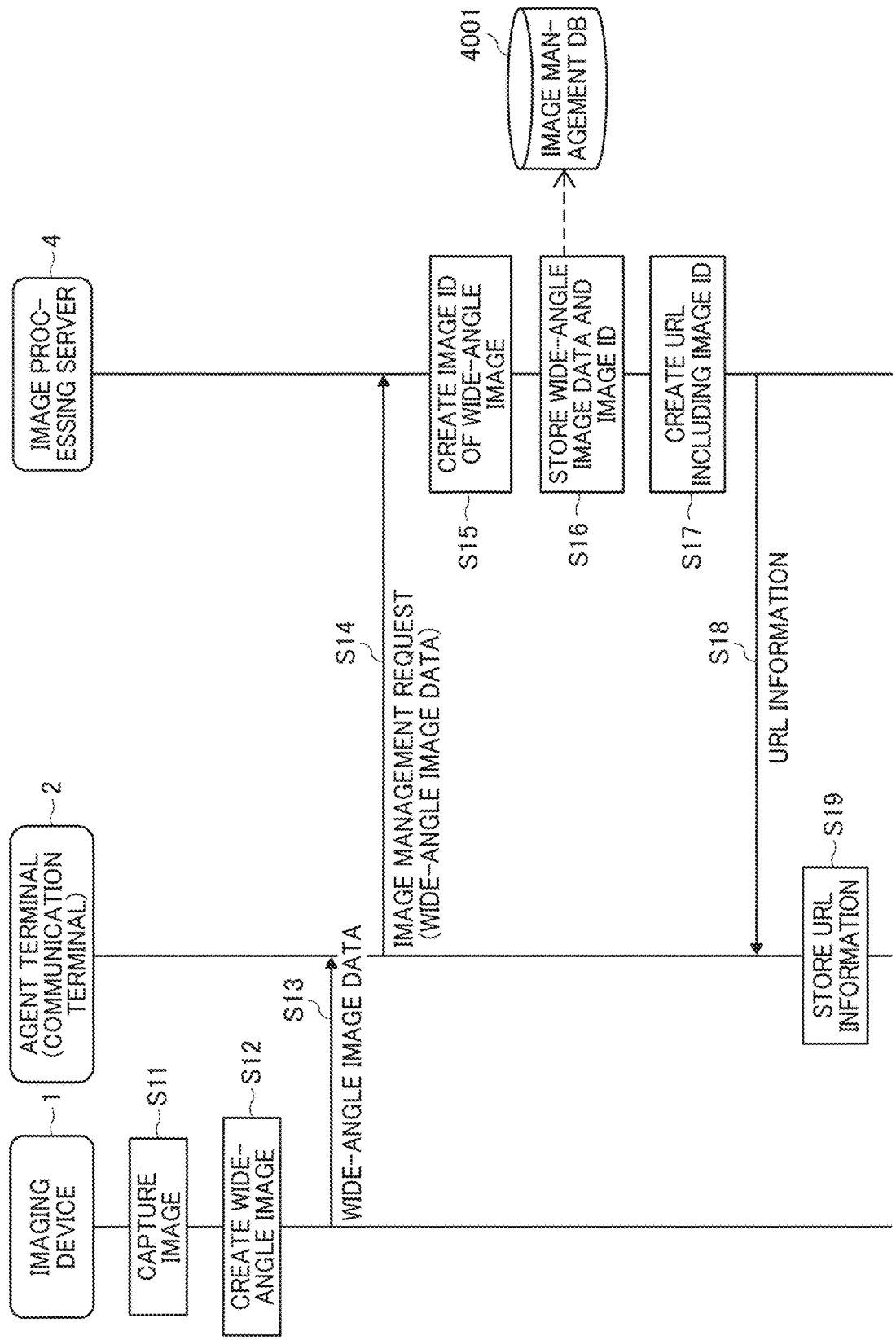
FIG. 16 is a sequence diagram illustrating a process of managing data of a wide-angle image.

First, a process in which the image processing server 4 manages data of a wide-angle image acquired from the agent terminal 2 is described with reference to FIG. 16. FIG. 16 is a sequence diagram illustrating a process of managing data of a wide-angle image.

First, the real estate agent A captures images of a room, which is real estate, using the imaging apparatus 1 (see FIG. 2) (S11).

Next, the imaging apparatus 1 creates, for the agent terminal 2, data of a wide-angle image (see FIG. 3C), which is an equirectangular projection image, based on two captured images (see FIGS. 3A and 3B) obtained by capturing images in step S11 (S12). Then, the imaging apparatus 1 transmits the data of the wide-angle image created in step S12 to the agent terminal 2 (S13). As a result, the transmitting-and-receiving unit 21 of the agent terminal 2 receives the wide-angle image data.

Next, the transmitting-and-receiving unit 21 of the agent terminal 2 transmits an image management request indicating a request for managing the wide-angle image to the image processing server 4 (S14). The image management request includes data of the wide-angle image created in step S13, which is a management target. Accordingly, the transmitting-and-receiving unit 41 of the image processing server 4 receives the image management request.

Subsequently, the image processing server 4 creates an image ID for identifying the wide-angle image received in step S14 (S15). The storing-and-reading unit 49 stores and manages the image ID created in step S15 and the wide-angle image data received in step S14 in association with each other (S16) in the image management DB 4001. Further, the creating unit 43 creates a URL including the image ID created in step S15 so that the agent terminal 2 can acquire the data of the wide-angle image managed by the image processing server 4 (S17).

Next, the transmitting-and-receiving unit 41 transmits the URI: information indicating the URL created in step S17 to the agent terminal 2 of the image management request source (S18). Thus, the transmitting-and-receiving unit 21 of the agent terminal 2 receives the URL information.

Next, in the agent terminal 2, the storing-and-reading unit 29 stores the URL information received in step S18 in the storage unit 2000 (S19).

Cutout Parameter Creating Request

Figure 18:
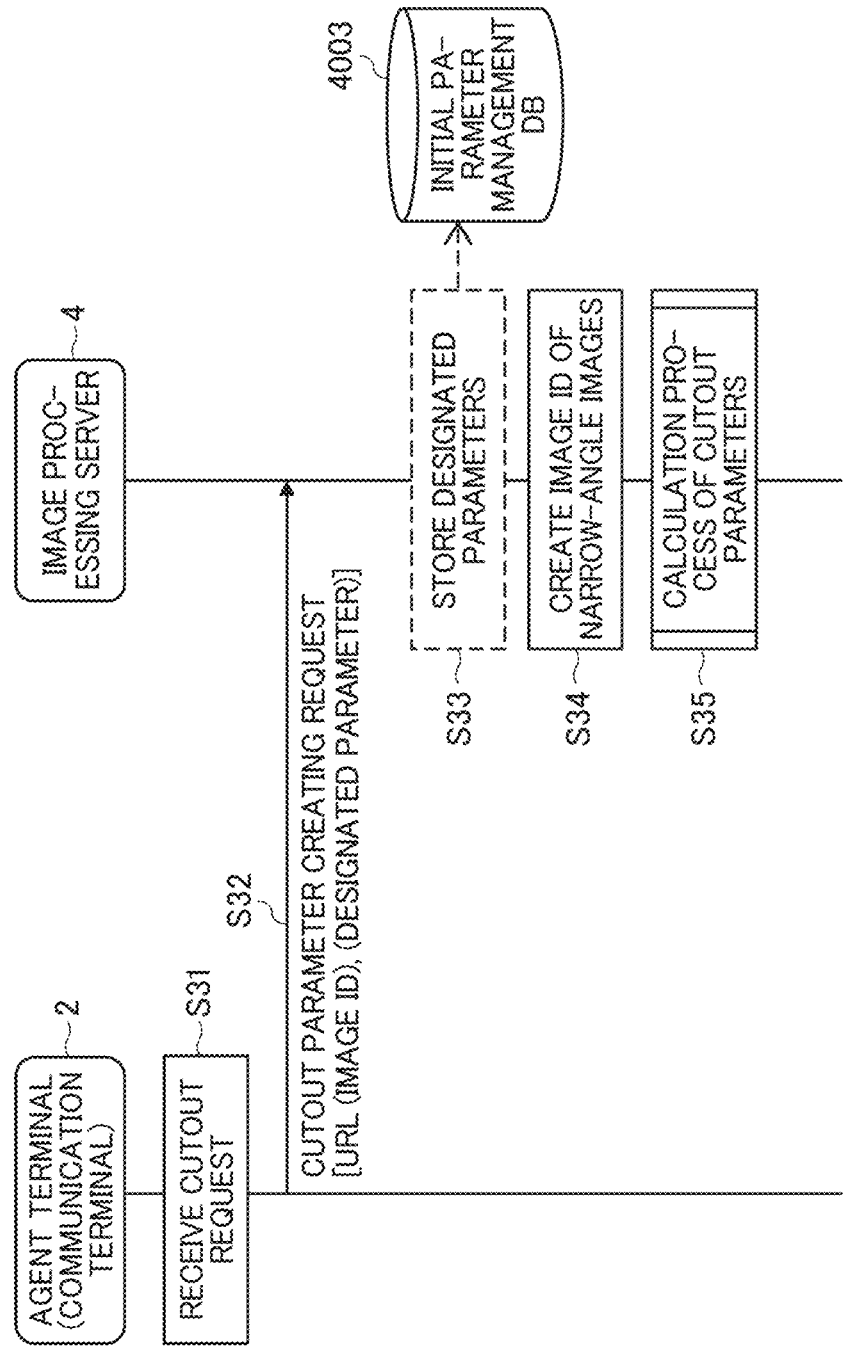
FIG. 18 is a sequence diagram illustrating a process of creating a cutout parameter.

Next, with reference to FIG. 18, a description is given of processing of a request for the image processing server 4 to create a narrow angle parameter from a wide angle image. The request is sent from the agent terminal 2 to the image processing server 4. FIG. 18 is a sequence diagram illustrating the cutout parameter creation processing.

First, the receiving unit 22 of the agent terminal 2 receives, from the real estate dealer A, a request for a cutout parameter necessary for displaying a narrow-angle image (S31). Next, the transmitting-and-receiving unit 21 transmits a cutout parameter creating request to the image processing server 4 (S32). The creating request includes the URL received by the agent terminal 2 in step S18 of FIG. 16. As described above, the URL includes the image ID of the wide-angle image. When the real estate agent inputs a designated parameter at the agent terminal 2, the designated parameter is also transmitted. As described above, the designated parameter is at least one of the angle of view $\alpha$, the tilt angle $\varphi$, the height H, and the width W. Accordingly, the transmitting-and-receiving unit 41 of the image processing server 4 receives the cutout parameter creating request.

Next, when the designated parameter is received in step S32, the storing-and-reading unit 49 stores the received designated parameter in the designated parameter field of the initial parameter management DB 4003 (S33). The processing of storing the designation parameter in the image processing server 4 may be separately performed before the processing of step S31.

Next, the creating unit 43 creates an image ID (for example, crop 01) for identifying the narrow-angle image to be cut out from the wide-angle image (S34).

Next, the image processing unit 47 performs a cutout parameter calculation process (S35). This calculation process will be described later.

Method of Acquiring Intersection Point Coordinates

Figure 19:
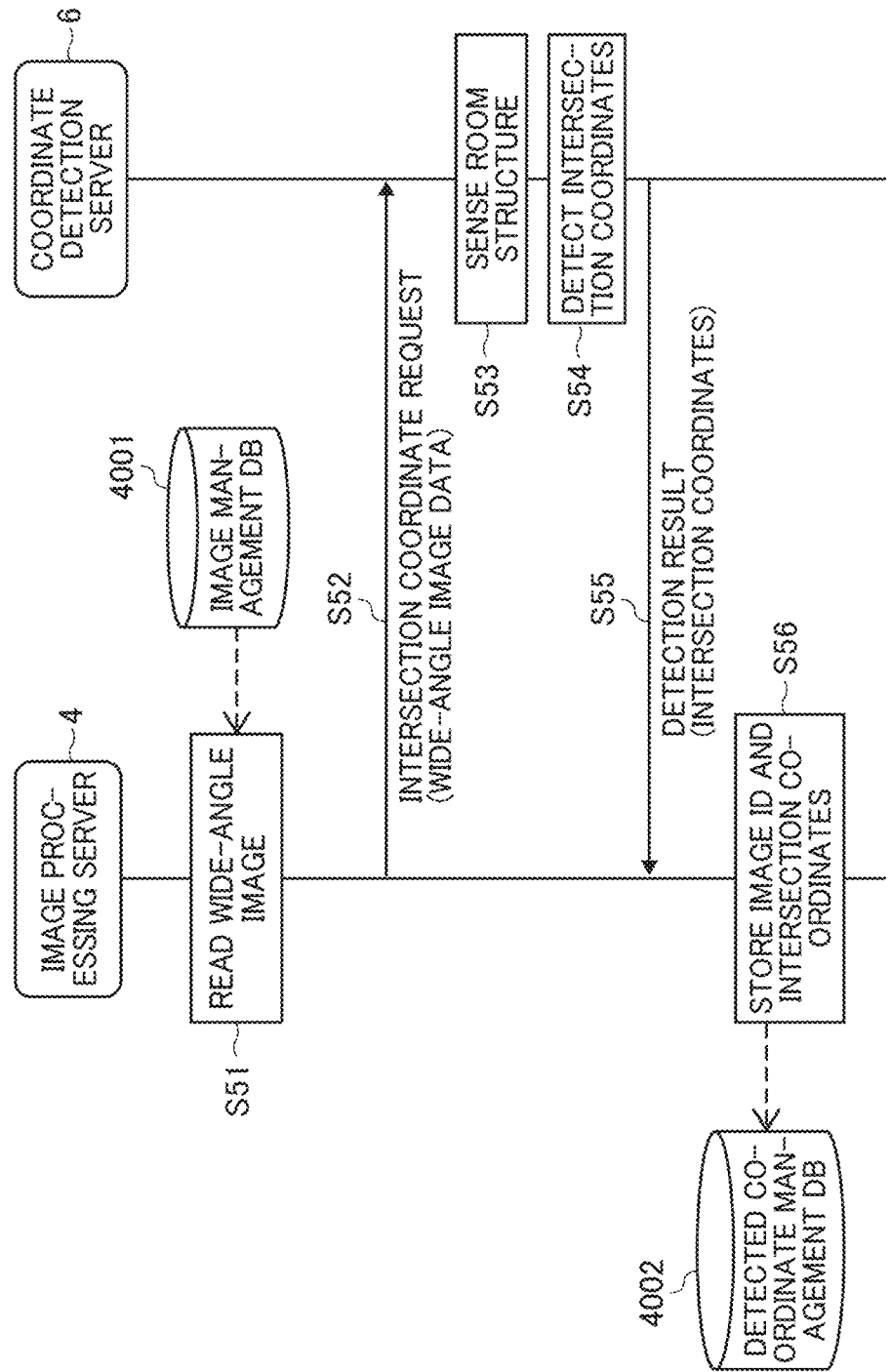
FIG. 19 is a sequence diagram illustrating a process in which an image processing server acquires intersection coordinates in a wide-angle image from a coordinate detection server.

When the image processing server 4 creates a cutout parameter based on the structure of a building appearing in the wide-angle image, the structure is detected from the wide-angle image. Therefore, before the process of step S35 in FIG. 18, the image processing server 4 acquires, from the coordinate detection server 6, the intersection coordinates that are the detection result of detecting the structure from the wide-angle image. Hereinafter, a process in which the image processing server 4 acquires the intersection coordinates in the wide-angle image from the coordinate detection server 6 is described with reference to FIG. 19. FIG. 19 is a sequence diagram illustrating a process in which the image processing server 4 acquires the intersection coordinates in the wide-angle image from the coordinate detection server 6.

First, in the image processing server 4, the storing-and-reading unit 49 searches the image management DB 4001 using the image ID of the wide-angle image received in step S32 of FIG. 18 as a search key to read data of the corresponding wide-angle image (S51).

Next, the transmitting-and-receiving unit 41 transmits an intersection coordinate request for requesting intersection coordinates to the coordinate detection server 6 (S52). The intersection coordinate request includes the data of the wide-angle image read in step S51. Accordingly, the coordinate detection server 6 receives the intersection coordinate request.

Next, in the coordinate detection server 6, the structure sensing unit 63 detects the structure of a room, which is an example of a building, from the wide-angle image received in step S52 (S53).

Structure Detection of Building

Here, a method of detecting the structure of a building is described with reference to a room as an example of a building illustrated in FIG. 20. FIG. 20 is a conceptual diagram of a teacher image illustrating a structure of a room at the time of machine learning.

Figure 17:
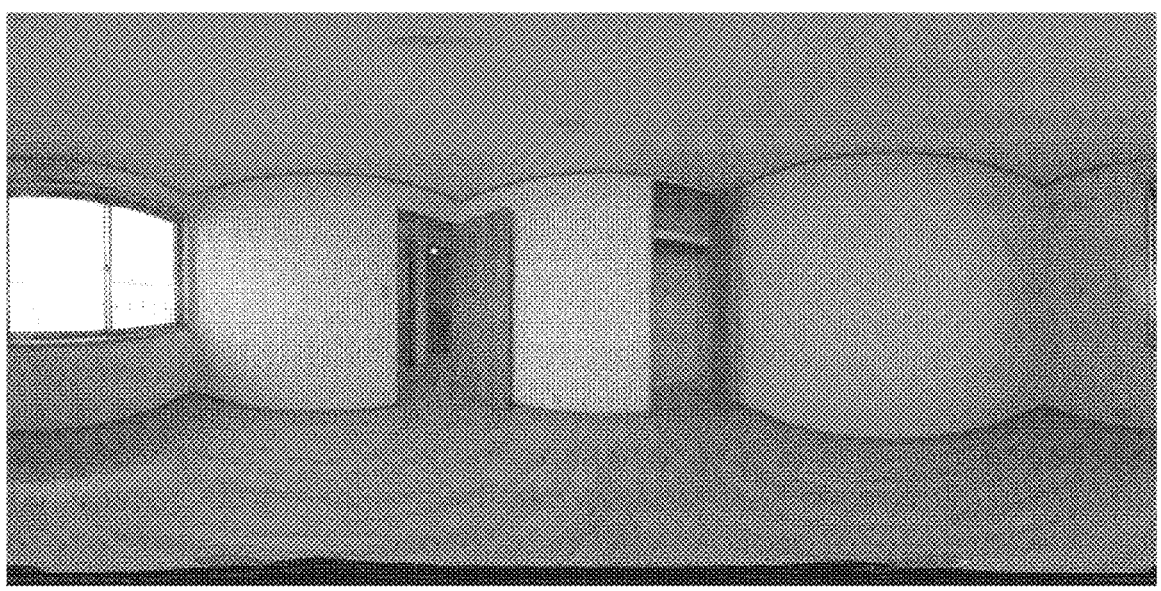
FIG. 17 is a diagram illustrating a wide-angle image.
Figure 20:
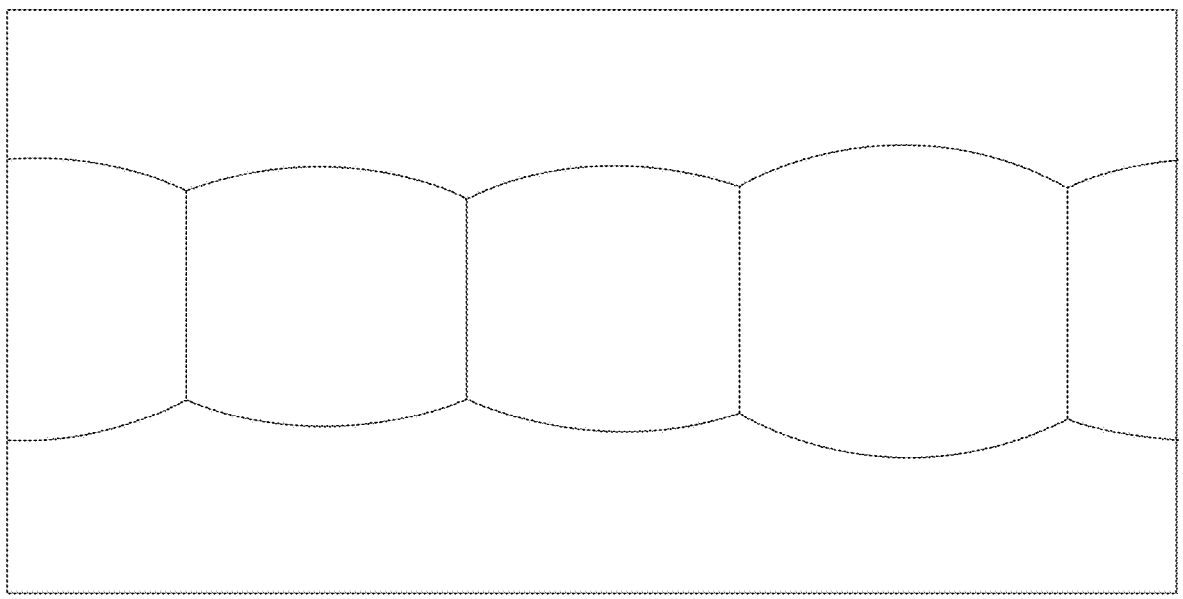
FIG. 20 is a conceptual diagram of a teacher image illustrating a structure of a room at the time of machine learning.

First, in machine learning, the structure sensing unit 63 pairs the input image (wide-angle image) in FIG. 17 and the teacher image in FIG. 20 in which only the boundaries of the wall, floor, and ceiling of the structure are represented from the input image, and performs learning so that an output image can be obtained from the input image. The output image is substantially the same as the teacher image. This learning can be implemented by a convolutional neural network that generates an image from a general image.

On the other hand, in the case of image processing rather than machine learning, an output image is obtained by combining processing of extracting an edge of a wide-angle image and a vanishing point. The vanishing point is a point at which parallel lines intersect each other when the parallel lines are actually parallel with each other but are drawn not to be parallel with each other in the perspective. In this case, the structure sensing unit 63 can be implemented by statistically obtaining a portion having the highest edge strength, selecting intersecting points according to vanishing points from the portion, and performing fine adjustment so that the intersecting points are continuous.

Subsequently, referring back to FIG. 19, the coordinate detection unit 66 detects the coordinates (intersection coordinates) of each intersection of the boundary lines indicated by the boundary information as illustrated in FIG. 13B based on the boundary information of the output image (see FIG. 20) (S54). The transmitting-and-receiving unit 61 transmits the intersection coordinates detected in step S54 as a detection result to the image processing server 4 as a response to step S52 (S55). Accordingly, the transmitting-and-receiving unit 41 of the image processing server 4 receives the detection result.

Next, the storing-and-reading unit 49 of the image processing server 4 stores the image ID of the wide-angle image transmitted in step S32 and the intersection coordinates as the detection result received in step S55 in association with each other in the detection coordinate management DB 4002 (S56).

Cutout Parameter Calculation Process

Figure 21A:
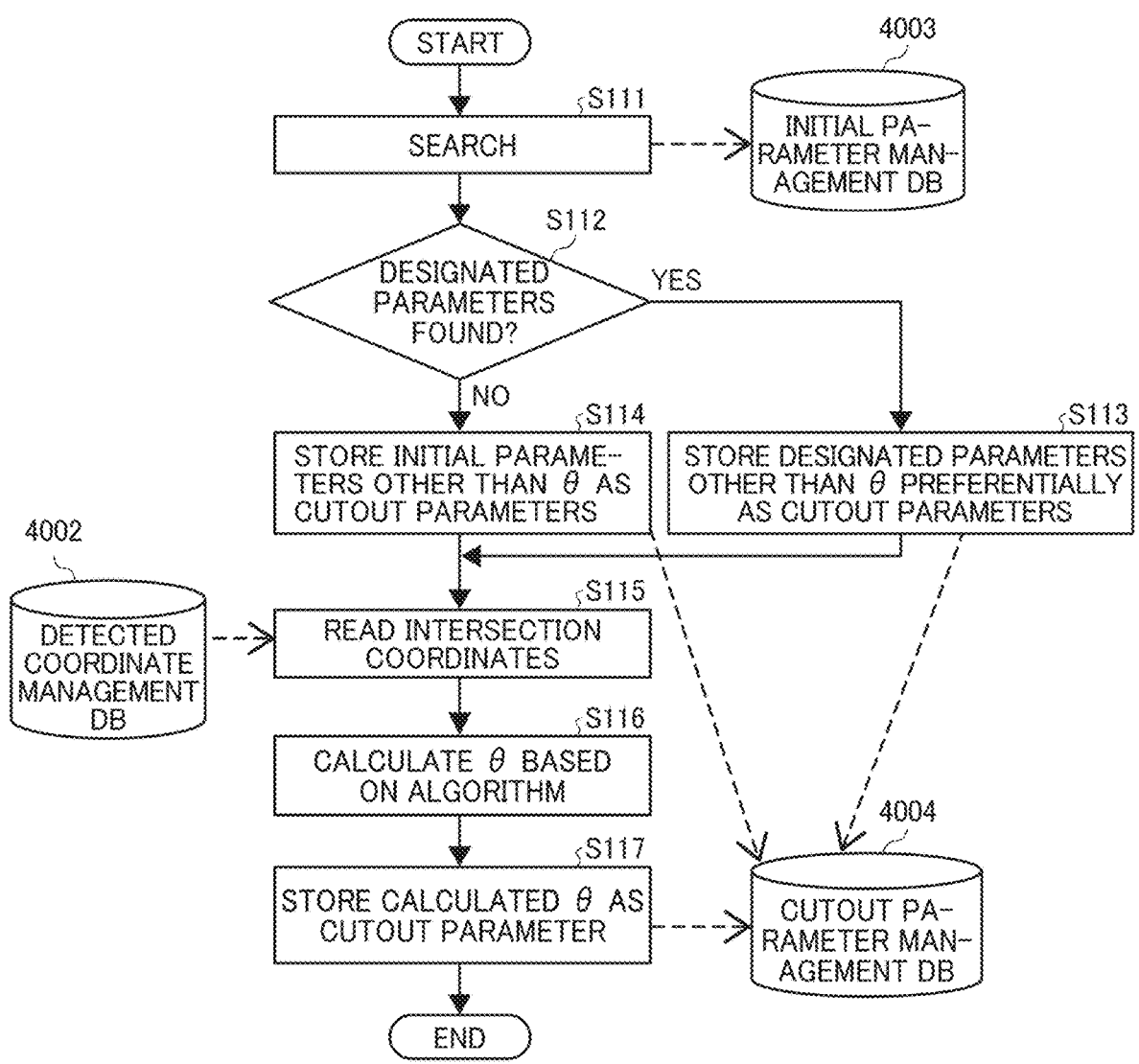
FIG. 21A is a flowchart illustrating a setting process of cutout parameters in a case where narrow-angle images are cut out by a combination of composition and importance or a setting process of cutout parameters in a case where narrow-angle images are cut out only by composition.
Figure 21B:
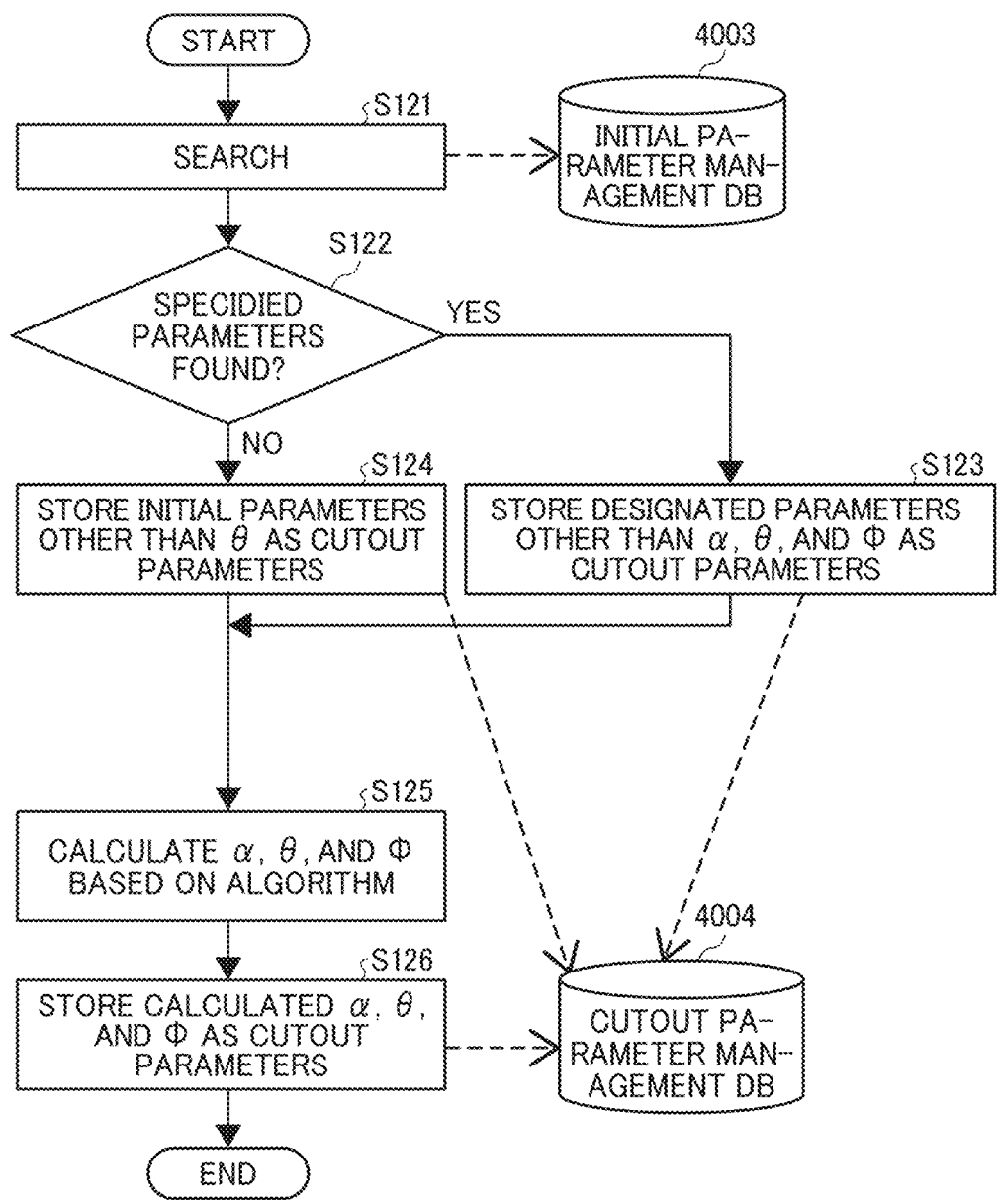
FIG. 21B is a flowchart illustrating a setting process of cutout parameters in a case where narrow-angle images are cut out only by importance.

Next, the cutout parameter calculation process in step S35 is described in detail with reference to FIGS. 21A to 28. FIG. 21A is a flowchart illustrating a setting process of cutout parameters in a case where the narrow-angle images are cut out by the combination of the composition and the importance (cutout mode 1) or a setting process of cutout parameters in a case where the narrow-angle images are cut out only by the composition (cutout mode 2). FIG. 21B is a flowchart illustrating a setting process of cutout parameters in a case where the narrow-angle images are cut out only by the importance (cutout mode 3).

Calculation of Cutout Parameter Using Structure

First, FIG. 21A is described below. As illustrated in FIG. 21A, the storing-and-reading unit 49 searches the initial parameter management DB 4003 for the designated parameters (S111). Next, the determination unit 45 determines whether the designated parameters are managed in the initial parameter management DB 4003 (S112). When the determination unit 45 determines that the designated parameters are managed (YES in S112), the storing-and-reading unit 49 stores the designated parameters other than the pan angle θ in the cutout parameter management DB 4004 as the corresponding cutout parameters (S113). In this case, in addition to the image ID of the wide-angle image, the storing-and-reading unit 49 stores the image Ds of the narrow-angle images created in step S33 in association with the cutout mode ID for specifying the cutout mode.

On the other hand, when the determination unit 45 determines that the designated parameters are not managed (NO in S112), the storing-and-reading unit 49 stores the initial parameters other than the pan angle θ in the cutout parameter management DB 4004 as the corresponding cutout parameters (S114). Also in this case, in addition to the image ID of the wide-angle image, the storing-and-reading unit 49 stores the image IDs of the narrow-angle images created in step S33 in association with the cutout mode ID for specifying the cutout mode.

Next, the storing-and-reading unit 49 searches the detected coordinate management DB 4002 using the image ID received in step S32 as a search key to read the corresponding intersection coordinates (S115).

Next, the calculation unit 46 calculates the pan angle θ according to a predetermined algorithm using the intersection coordinates (S116). This calculation method will be described later in detail with reference to FIGS. 22A to 26.

Finally, the storing-and-reading unit 49 stores the pan angle θ calculated in step S116 in the cutout parameter management DB 4004 as the corresponding cutout parameter (S117).

As described above, the process of calculating the cutout parameters using the structure of the building appearing in the wide-angle image is completed. At this time, whether uploading is permitted is not managed.

Calculation of Cutout Parameter Without Using Structure

Next, FIG. 21B is described below. In this case, since the structure of the building appearing in the wide-angle image is not used for the calculation of the cutout parameters, the process of reading the intersection coordinates from the detected coordinate management DB 4002 as in step S115 is omitted. Further, since the structure of the wide-angle image is not used, not only the pan angle θ but also the angle of view α and the tilt angle φ are calculated. This process is described in detail below.

First, as illustrated in FIG. 21B, the storing-and-reading unit 49 searches the initial parameter management DB 4003 for the designated parameters (S121). Next, the determination unit 45 determines whether the designated parameter is managed in the initial parameter management DB 4003 (S122). When the determination unit 45 determines that the designated parameters are managed (YES in S122), the storing-and-reading unit 49 stores the designated parameters other than the angle of view α, the pan angle θ, and the tilt angle φ in the cutout parameter management DB 4004 as the corresponding cutout parameters (S123). In this case, in addition to the image ID of the wide-angle image, the storing-and-reading unit 49 stores the image IDs of the narrow-angle images created in step S33 in association with the cutout mode ID for specifying the cutout mode.

On the other hand, when the determination unit 45 determines that the designated parameters are not managed (NO in S122), the storing-and-reading unit 49 stores the initial parameters other than the angle of view α, the pan angle θ, and the tilt angle φ in the cutout parameter management DB 4004 as the corresponding cutout parameters (S124). Also in this case, in addition to the image ID of the wide-angle image, the storing-and-reading unit 49 stores the image IDs of the narrow-angle images created in step S33 in association with the cutout mode ID for specifying the cutout mode.

Next, the calculation unit 46 calculates the angle of view α, the pan angle θ, and the tilt angle φ based on a predetermined algorithm by using the intersection coordinates (S125). This calculation method will be described later in detail with reference to FIGS. 27 and 28.

Finally, the storing-and-reading unit 49 stores the angle of view α, the pan angle θ, and the tilt angle φ calculated in step S125 in the cutout parameter management DB 4004 as the corresponding cutout parameters (S126).

As described above, the process of calculating the cutout parameter is completed without using the composition of the building represented in the wide-angle image. At this time, the presence or absence of upload is not managed.

Detailed Calculation Method of Cutout Parameter

Next, with reference to FIG. 22A to FIG. 28, the calculation methods in steps S116 and S125 are described in detail.

Figure 22A:
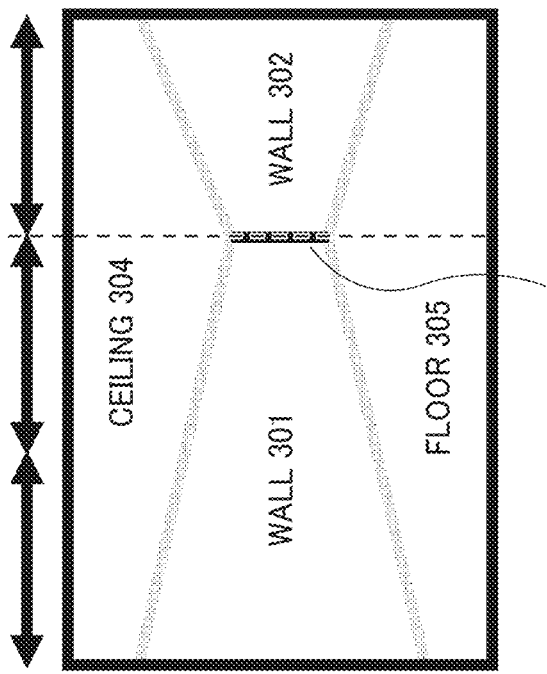
Figure 22B:
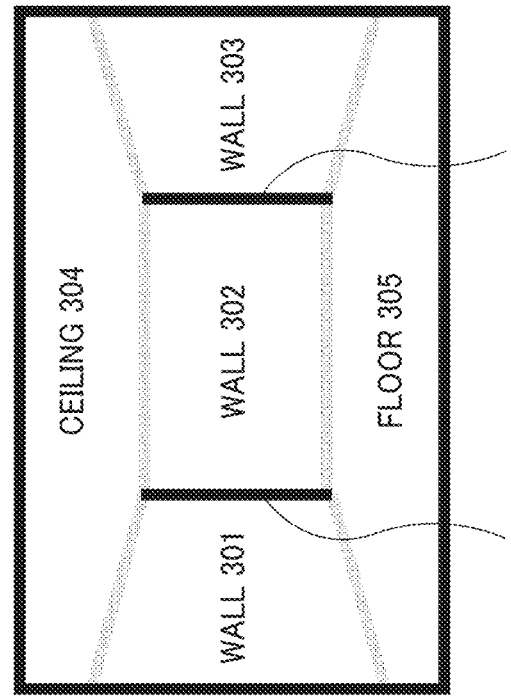

First, in describing the calculation method, the composition of an image in which a building looks beautiful, for example, a room looks beautiful is described with reference to FIGS. 22A and 22B. FIGS. 22A and 22B are diagrams illustrating examples of the composition of an image when a room looks beautiful. FIG. 22A illustrates a three-sided composition and FIG. 22B illustrates a two-sided composition.

The three-sided composition illustrated in FIG. 22A is based on the condition that a central portion of a wall 302 is located at a central portion of the image, walls 301 and 303 on both sides of the wall 302 have the same shape, and a ceiling 304 and a floor 305 are represented at the same ratio. As described above, the ceiling and the floor are included because it is difficult for a person to grasp the space unless the ceiling and the floor are displayed. In this three-sided composition, the wall 301 is represented on the left of the central wall 302 and a post 3012 is represented as the boundary between the wall 301 and the wall 302. The wall 303 is represented on the right of the central wall 302 and a post 3023 is represented as the boundary between the wall 302 and the wall 303.

The two-sided composition illustrated in FIG. 22B is based on the condition that the post 3023 as the boundary of the wall is located at one-third of the horizontal width of the entire image and the ceiling 304 and the floor 305 are represented at the same ratio. In this two-sided composition, the wall 301 is represented to be larger on the left of the post 3012 and the wall 302 is represented to be smaller on the right of the post 3023. Here, the post is represented as an example of the boundary, but the boundary is not limited to the post as long as the boundary is represented. In general, the two-sided composition is a balanced and stable composition when it is assumed that a screen is divided into nine equal parts (divided into three equal parts in each of the vertical and horizontal directions) by two horizontal lines and two vertical lines drawn at equal intervals and important elements in the composition are arranged on the lines or intersections of the lines.

Next, the processing of step S116 is described in detail. Here, based on the boundary information indicating the wall, the ceiling, and the floor, the image processing unit 47 performs cutout on each of the wide-angle images representing the two types of compositions illustrated in FIGS. 22A and 22B.

First, the image processing unit 47 selects a wall to be cut out. The wall to be cut out is the farthest wall.

Figure 23:
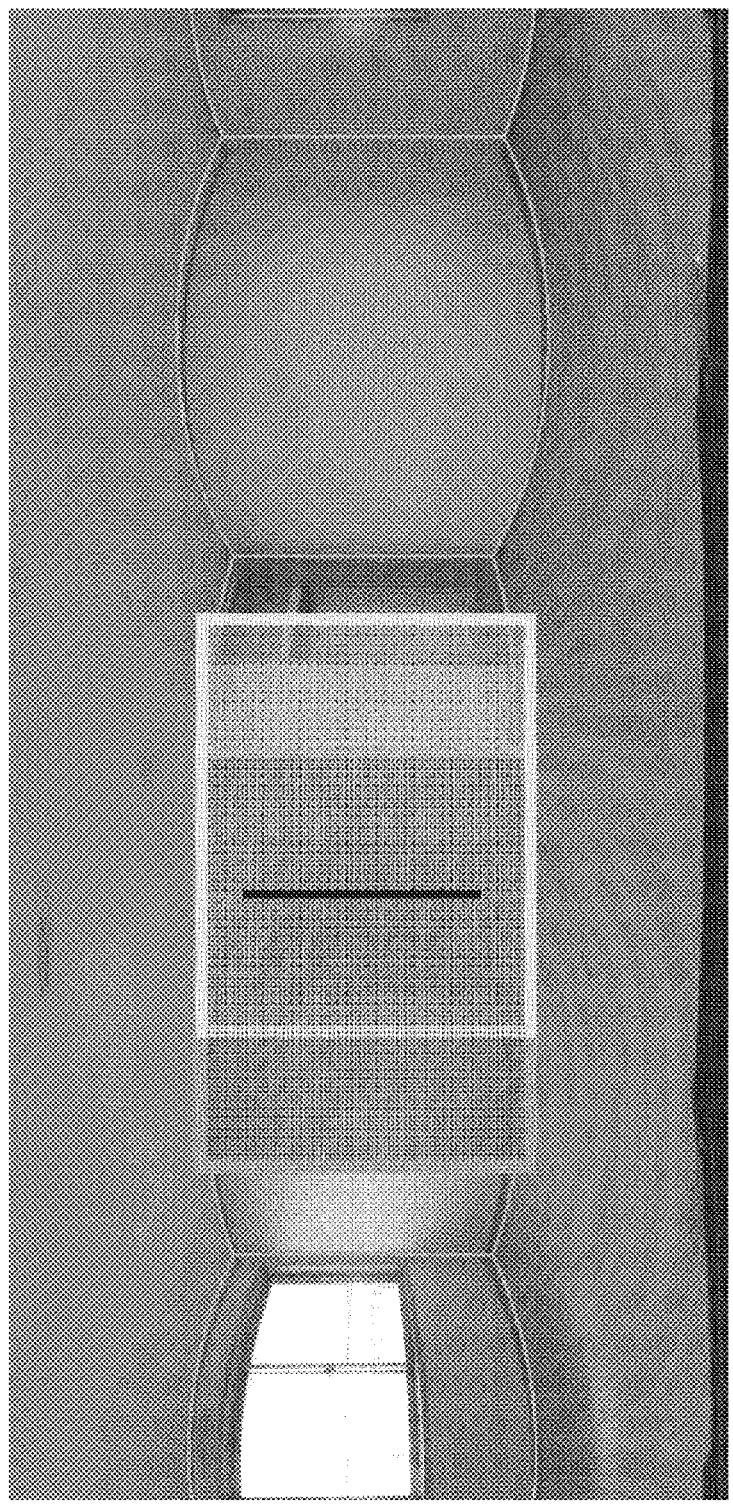
FIG. 23 is a conceptual diagram of a wide-angle image illustrating two candidates of two-sided composition calculated by using a composition in a case where a narrow-angle image is cut out by using a two-sided composition and importance.

Then, the image processing unit 47 performs cutout in the two compositions illustrated in FIGS. 22A and 22B with reference to the boundary of the farthest wall. First, the image processing unit 47 performs cutout in the two-sided composition. The image processing unit 47 calculates the viewpoint so that the boundary of the farthest wall is positioned at one-third from each of the left and right of the image to be cut out. FIG. 23 is a conceptual diagram of a wide-angle image illustrating two candidates of the two-sided composition. As illustrated in FIG. 23, since two candidates of the two-sided composition are calculated from one boundary (post) of the wall, only one of the two candidates can also be used by comparing the two candidates. As described above, the boundary (post) of the farthest wall is the boundary of the shortest length in the wide-angle image.

There are several methods of comparison. For example, a method can be used of comparing the sum of the degrees of importance in the cutout range by using an algorithm called importance estimation that reflects the sum of the brightness in the cutout range, the number of objects represented in the wide-angle image, and human attention. Importance estimation is an algorithm that takes a wide-angle image as an input and finds an important object in the wide-angle image. Details of the importance estimation are disclosed in JP-6511950-B (JP-2016-219879-A). When a saliency extraction method is used for the importance estimation, the importance is calculated by, for example, the following method. The calculation unit 46 calculates an edge amount for each pixel of each frame, using a Laplacian filter, a Gabor filter, or the like. Here, a larger edge amount indicates a stronger edge. The calculation unit 46 generates an edge amount distribution map indicating a distribution of edge amounts for each frame. The calculation unit 46 scans the edge amount distribution map using a window having a region of a predetermined size. When the statistical difference between the distribution of the edge amounts in the window and the distribution of the edge amounts in a peripheral region of the window is equal to or larger than a threshold, the calculation unit 46 increases the importance of the region at the position of the window. Here, the statistical difference can be obtained by measuring the distance between the distributions of the edge amounts using the Kullback-Leibler divergence, the Bhattachaiyya distance, and the like.

Figure 24:
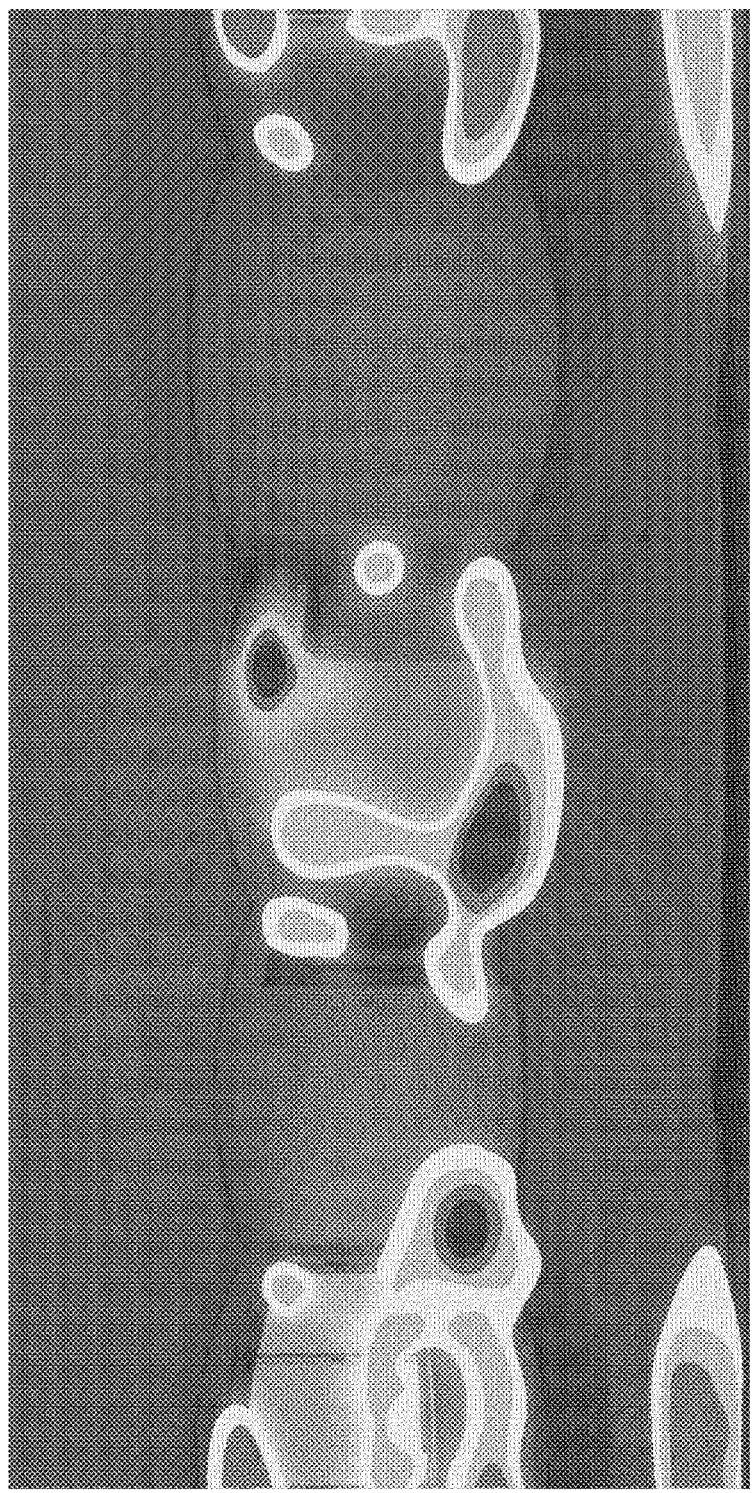
FIG. 24 is a conceptual diagram of a wide-angle image indicating degrees of importance in a case where a narrow-angle image is cut out by using a two-sided composition and importance.

FIG. 24 is a conceptual diagram of a wide-angle image illustrating importance. In FIG. 24, it is illustrated that the degree of importance is low in light portions and is high in dark portions. In the case wherein the cutout parameters are calculated based on only the importance without using the composition of the wide-angle image, the image processing unit 47 cuts out a predetermined area including many dark portions illustrated in FIG. 24.

Figure 25:
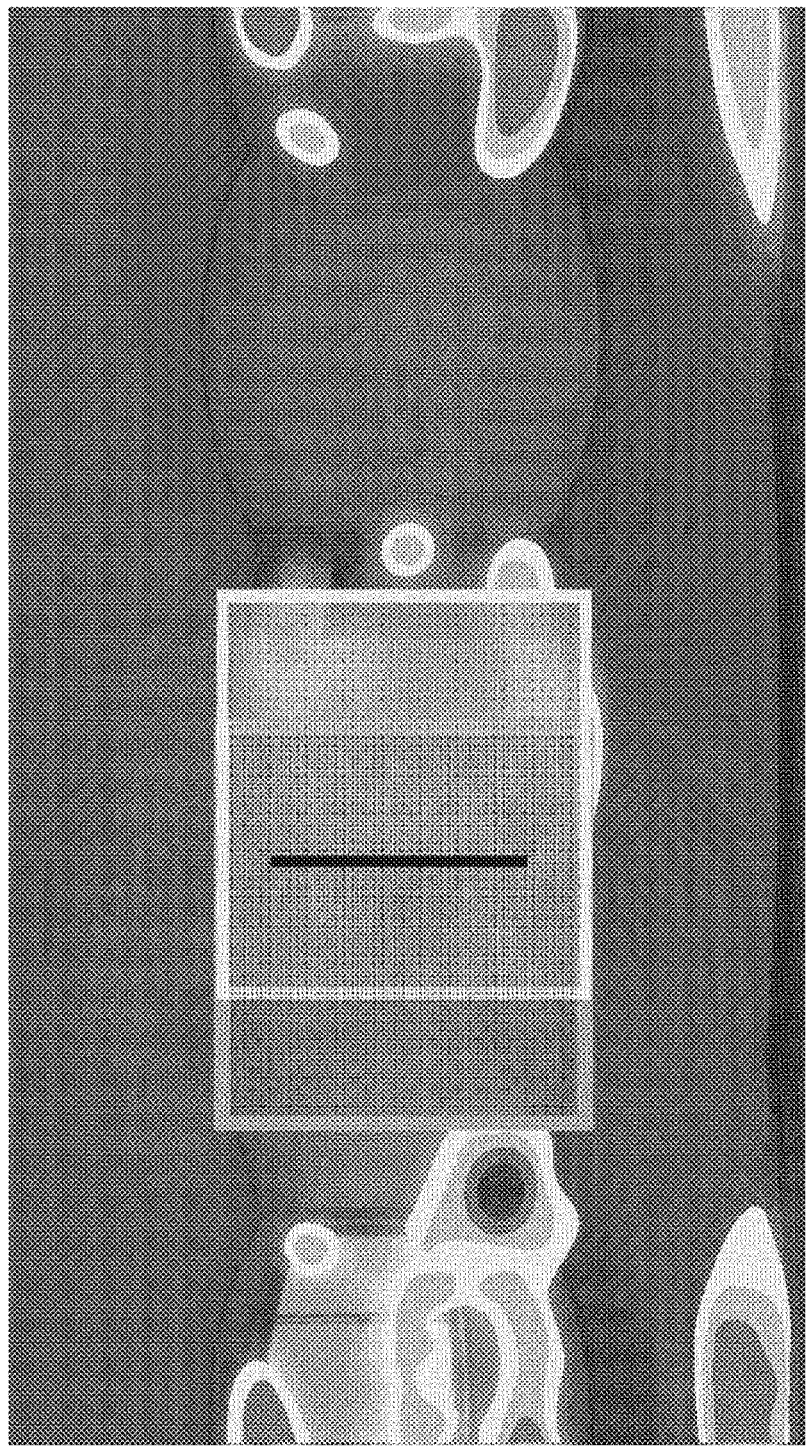
FIG. 25 is a conceptual diagram of a wide-angle image illustrating a case in which, when a narrow-angle image is cut out by using a two-sided composition and importance, two candidates of two-sided composition calculated by using the composition are narrowed down to one in consideration of importance.
Figure 26:
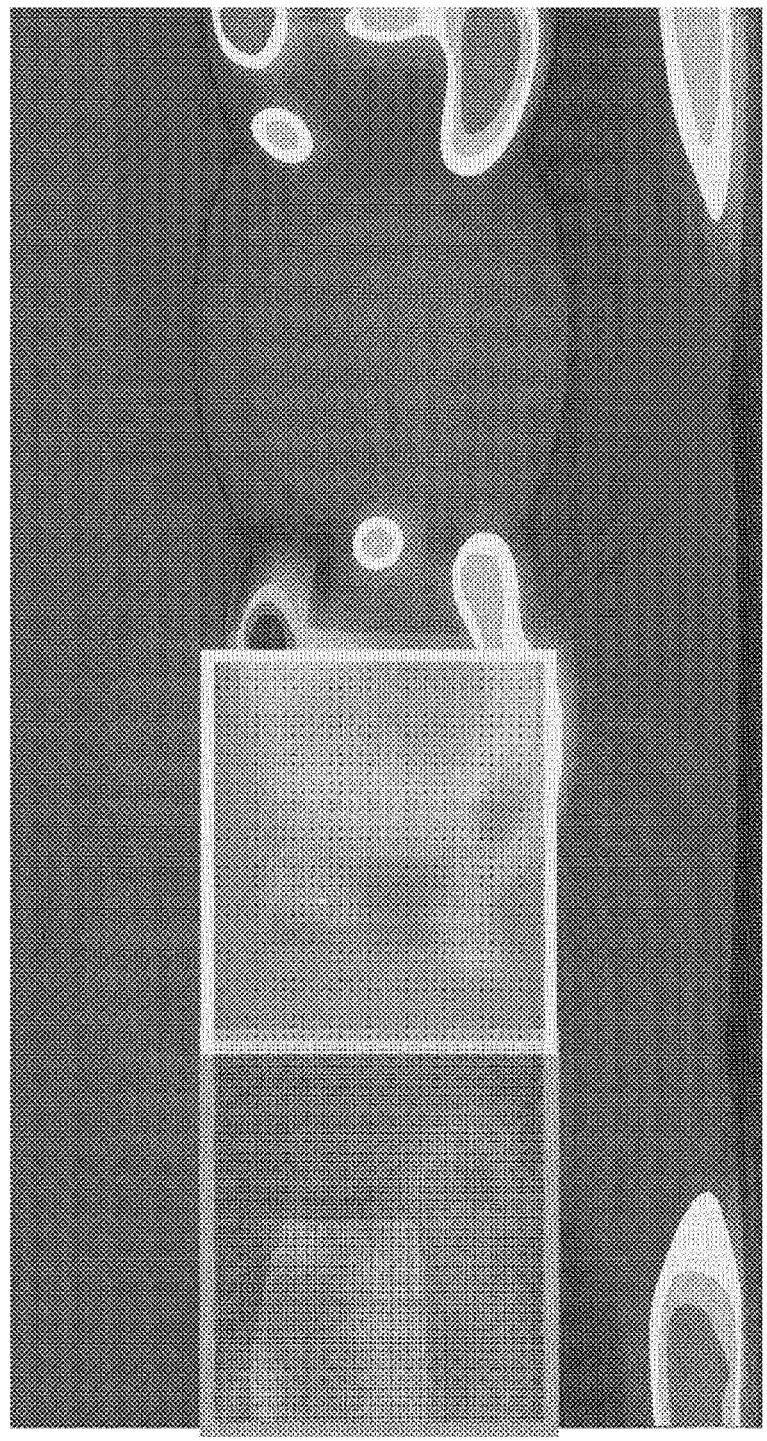
FIG. 26 is a conceptual diagram of a wide-angle image in a case where a narrow-angle image is cut out by ignoring composition and using only importance.

FIG. 25 is a conceptual diagram of a wide-angle image for comparison to determine which of two-sided compositions determined as candidate including a wall (post) far from the imaging apparatus 1 is adopted by using importance estimation. In this example, since the right composition has a larger total importance, the right composition can be preferentially used.

Note that candidates representing a building may be extracted by performing cutout in the two sided composition and the three sided composition with reference to all posts, instead of using the farthest wall (post) as a reference. In this case, for each of the boundaries of the wall, first, the two-sided composition is compared in importance and cut out. Thereafter, the image processing unit 47 cuts out the three-sided composition with the center of each wall as the center. The narrow-angle images having been cut out as described above can be presented as candidates for a narrow-angle image representing the building. Next, the image processing unit 47 cuts out an image having a three-sided composition from the wide-angle image. Since the wall is not zoomed up (not displayed in a large size) in the image of the three-sided composition, the composition is formed based on the far wall as in the two-sided composition. In this case, similarly to the two-sided composition, there are two candidates of whether to center the right wall or the left wall of the boundary of the wall. There are two methods: one method in which both of the two candidates are used as the cutout result and another method in which either one of the two candidates is used as the cutout result by comparison based on the above-described importance estimation method or the redundancy of the two-sided composition. In this case, overlapping of the ranges to be cut out can be reduced, and a situation in which a large number of similar narrow-angle images are cut out can be avoided.

Next, the image processing unit 47 cuts out the narrow-angle image from the wide-angle image only by the importance without using the structure. In the compositions described above, the composition is selected by determining the entire structure from the boundary. However, when the composition is determined only by the importance, a narrow-angle image can be cut out by focusing on an object in the building. For example, the narrow-angle image can be cut out by focusing on a chair, a desk, a painting, a bed, a sofa, or the like. The image processing unit 47 uses the result of the importance estimation illustrated in FIG. 26 to cut out the periphery of an object regarded as important in the room. These composition candidates can also be obtained as a result of comparing the candidates by some method and cutting out only a part of the candidates, similarly to the two-sided composition and the three-sided composition.

Figure 27:
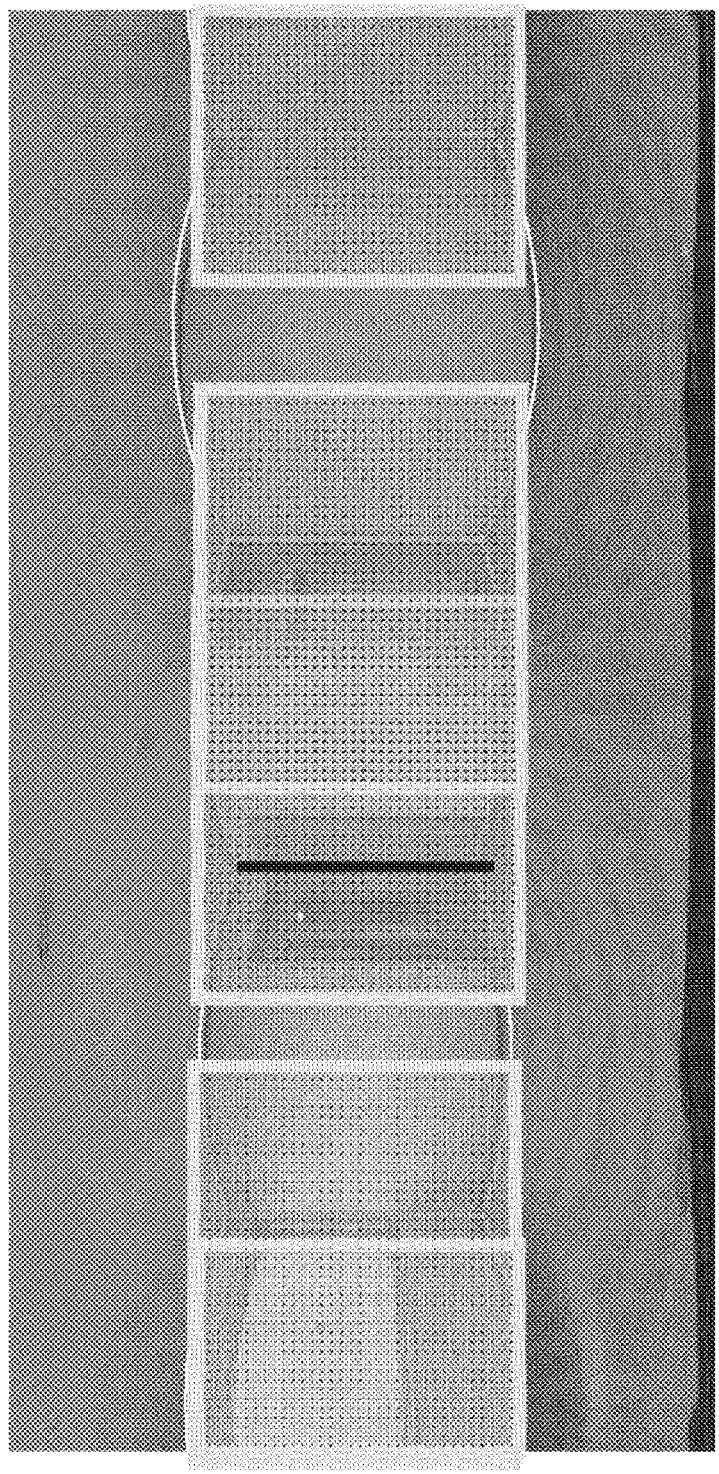
FIG. 27 is a conceptual diagram of a wide-angle image in a case where a narrow-angle image is cut out by using only a two-sided composition.
Figure 28:
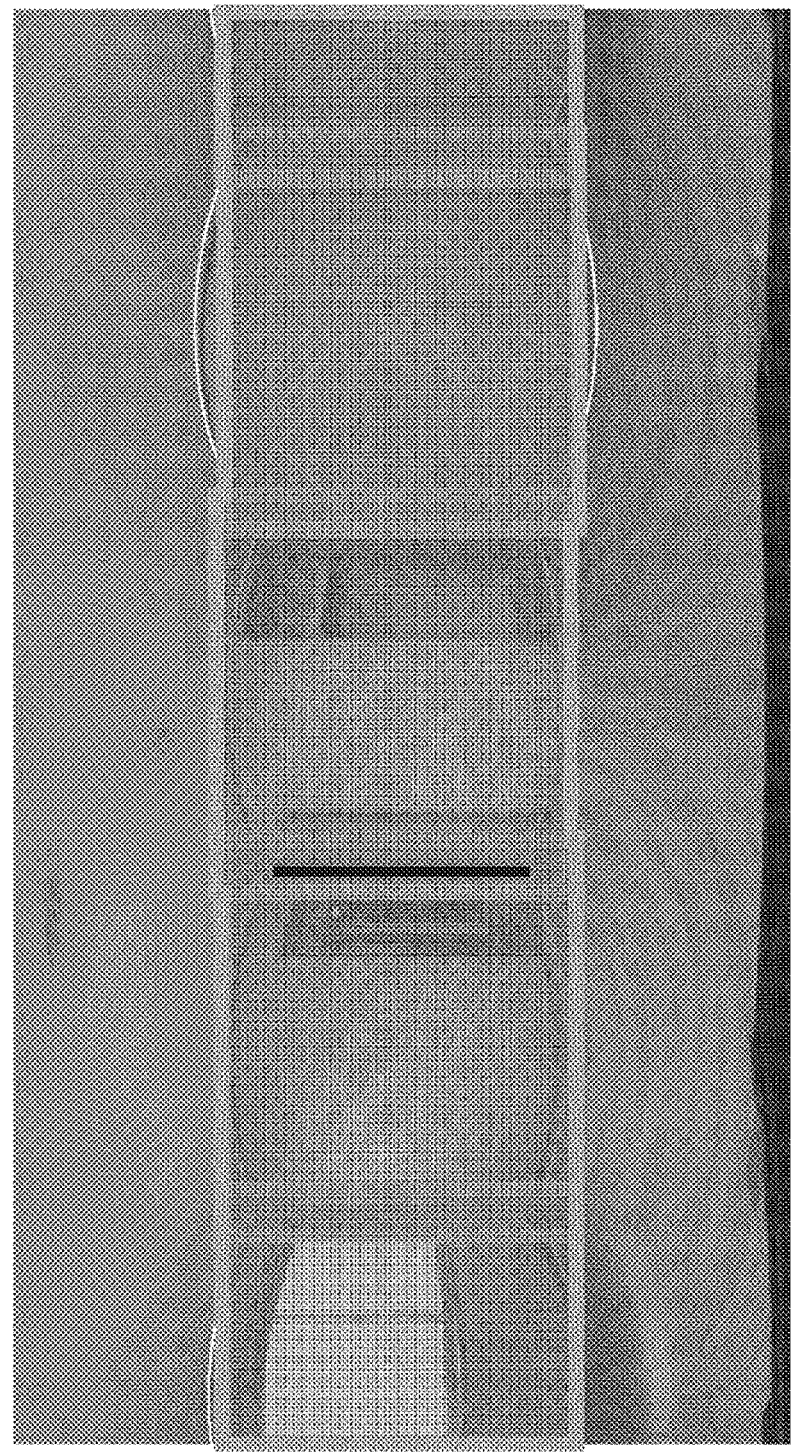
FIG. 28 is a conceptual diagram of a wide-angle image in a case where a narrow-angle image is cut out by using only a three-sided composition.

FIG. 27 is a conceptual diagram illustrating a case where a cutout image having a two-sided composition is cut out using only boundary information indicating a structure. FIG. 28 is a conceptual diagram illustrating a case where a cutout image of a trihedral composition is cut out using only boundary information indicating the structure. In the case of only the structure, the two-sided composition and the three-sided composition can be selected using the boundary of the building. The image processing unit 47 cuts out narrow-angle images based on all the walls, for example, in the same manner as described above.

Narrow-angle Image Selection Processing

Figure 29:
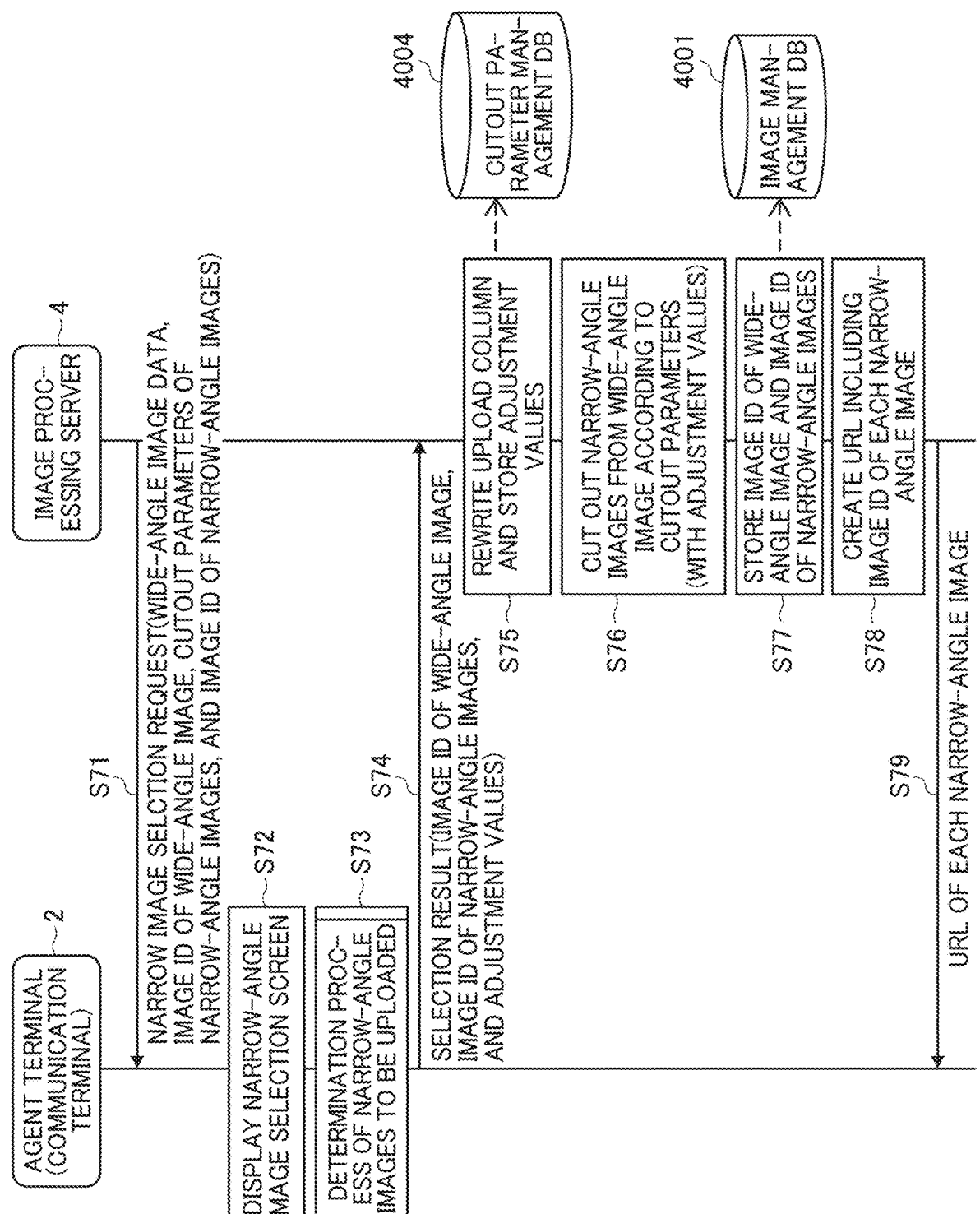
FIG. 29 is a sequence diagram illustrating a process of determining a narrow-angle image to be uploaded to and registered in a real estate introduction server.

The narrow-angle image indicated by each cutout parameter calculated in step S35 of FIG. 18 is provided or transmitted to the real estate introduction server 8, thus allowing the real estate agency A to introduce real estate to the customer B. However, since each cutout parameter calculated in step S35 is automatically calculated by the image processing server 4, it is desirable that the real estate agent itself finally determines the narrow-angle image to be introduced to the customer. Then, processing for determining the narrow-angle image to be uploaded from the agent terminal 2 to the real estate introduction server 8 is described with reference to FIGS. 29 to 32. FIG. 29 is a sequence diagram illustrating a process for determining a narrow-angle image to be uploaded and registered in the real estate introduction server.

First, the transmitting-and-receiving unit 41 of the image processing server 4 transmits, to the agent terminal 2, a narrow-angle image selection request for causing to the agent terminal 2 to select a narrow-angle image (S71). The narrow-angle image selection request includes the data of the wide-angle image, the image ID of the wide-angle image, the cutout parameters used to display the narrow-angle images, and the image IDs of the narrow-angle images. Accordingly, the agent terminal 2 receives the narrow-angle image selection request.

Figure 30:
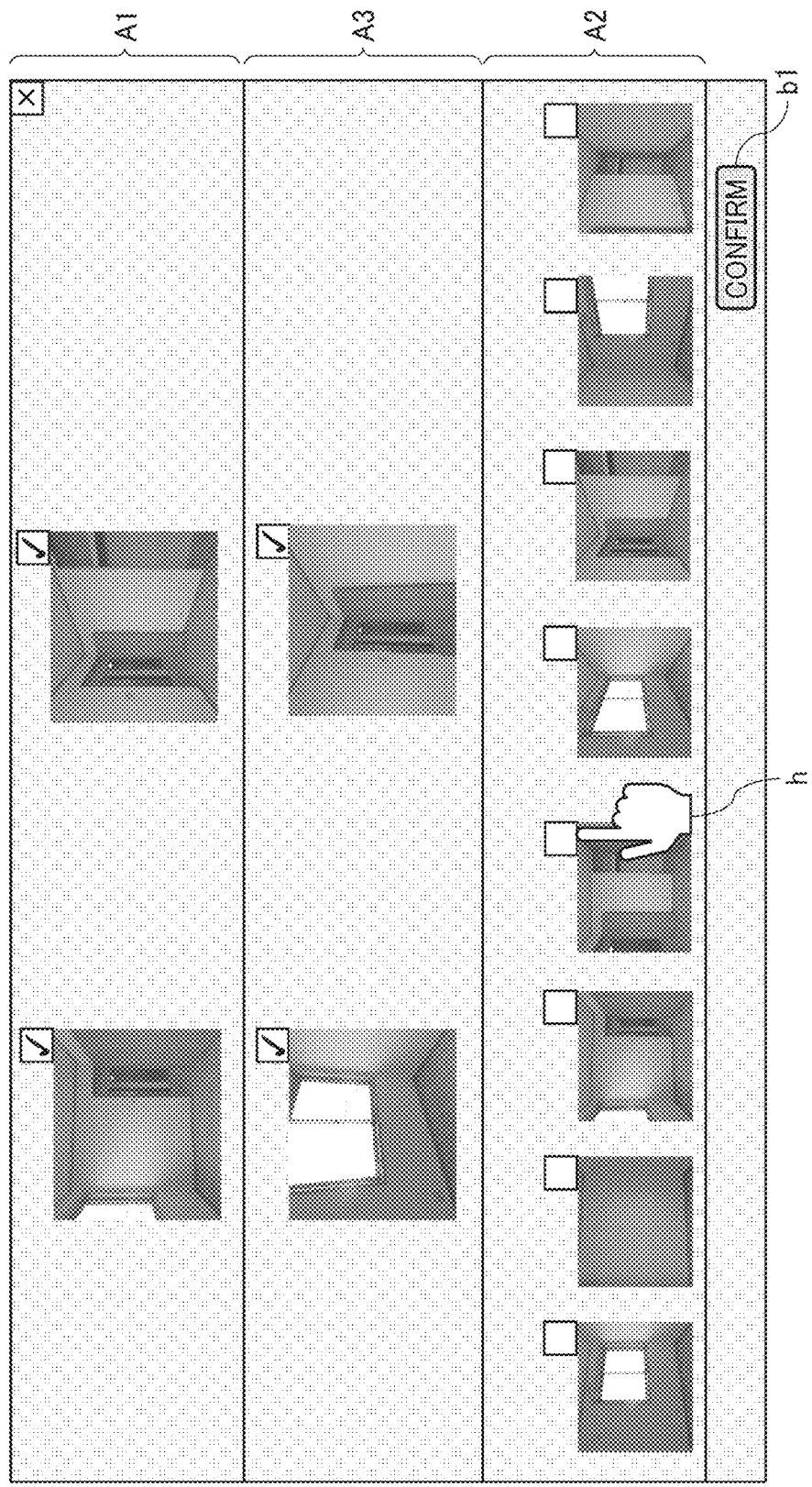
FIG. 30 is a diagram illustrating a narrow-angle image selection screen initially displayed by an agent terminal.

Next, in the agent terminal 2, the display control unit 24 displays a narrow-angle image selection screen as illustrated in FIG. 30 on the display 208 based on the predetermined area indicated by each cutout parameter in the wide-angle image received in step S71 (S72). FIG. 30 is a diagram illustrating a narrow-angle image selection screen displayed first by the agent terminal 2. First narrow-angle image selection screen As illustrated in FIG. 30, the narrow-angle image selection screen includes three display regions A1, A3, and A2 from top to bottom. In the case of the cutout mode 1 (a1), a plurality of narrow-angle images created by the cutout parameters calculated based on the composition and importance of the wide-angle image are displayed in the display region A1. In the display region A3, a plurality of narrow-angle images created by the cutout parameters calculated based only on the importance are displayed in the cutout mode 3 (a3). In the display region A2, a plurality of narrow-angle images created by the cutout parameters calculated based on only the composition are displayed in the cutout mode 2 (a2).

On the upper right of each narrow-angle image, a check box for checking to indicate selection of a narrow-angle image to be uploaded to the real estate introduction server 8 is displayed. In the case of the present embodiment, since the narrow-angle images displayed in the display region A1 are calculated from both conditions of the composition and the importance, each of the narrow-angle images has a far wall and a good composition, and thus is an image suitable for introduction to the customer. Thus, by displaying the far wall, the narrow-angle image can display the entire far wall. In addition, since the narrow-angle images displayed in the display region A3 are calculated from the condition of the degree of importance to which a person pays attention, the narrow-angle images are suitable for introduction to the customer next to the display region A1. Therefore, the check boxes of the narrow-angle images displayed in the display regions A1 and A3 are checked from the beginning.

On the other hand, since the narrow-angles image displayed in the display region A2 are calculated from the condition of only the composition, there is a high possibility that the narrow-angle images include an image that is not suitable for introduction to the customer, compared to the display regions A1 and A3. Therefore, the check box of each narrow angle image displayed in the display region A23 is not checked from the beginning.

When the check box is checked, the storing-and-reading unit 49 sets "TRUE" in the upload field of the cutout parameter management table (see FIG. 15A). When the check box is not checked, the storing-and-reading unit 49 sets "FALSE" or sets nothing in the upload field of the cutout parameter management table.

A "confirm" button b1 at the lower right of the narrow-angle image selection screen is a button for finally confirming the narrow-angle image to be uploaded to the real estate introduction server 8.

Determination of Narrow-angle Image to be Introduced

Figure 31:
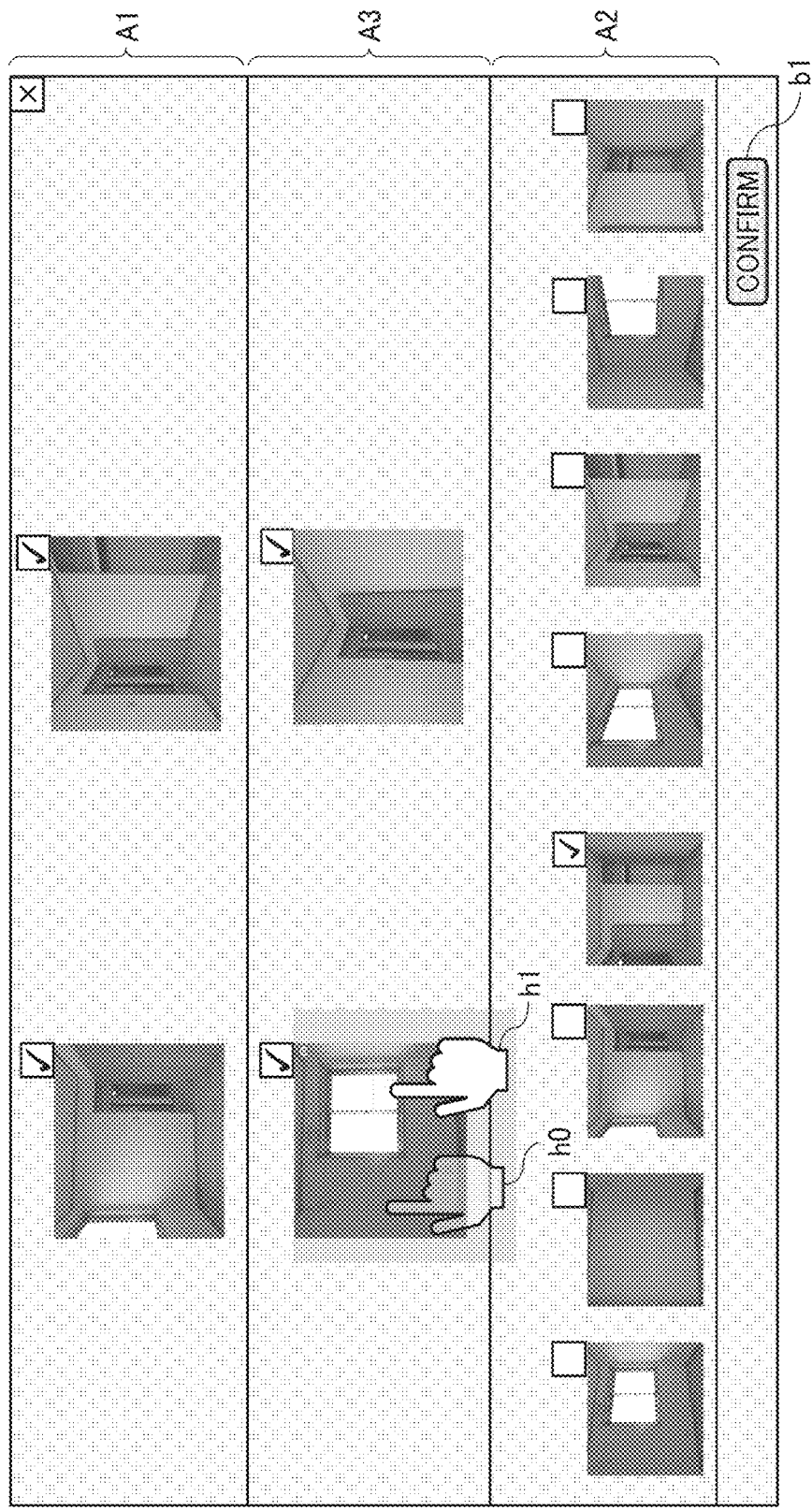
FIG. 31 is a diagram illustrating a changed narrow-angle image selection screen displayed by an agent terminal.

Next, referring back to FIG. 29, the agent terminal 2 determines the narrow-angle image to be uploaded to the real estate introduction server 8 in order to introduce to the customer B (S73). Here, the process of determining a narrow-angle image to be uploaded to the real estate introduction server 8 for introduction to a customer is described with reference to FIGS. 31 to 33. FIG. 31 is a diagram illustrating the changed narrow-angle image selection screen displayed by the agent terminal.

For example, in FIG. 30, when the real estate agent A wants to change a predetermined area of the narrow-angle image on the left side of the display region A2, the real estate agent A places a cursor h (of a hand shape) on the narrow-angle image to be changed using the mouse 212 and moves the cursor h. In FIG. 31, a cursor h0 indicates the cursor h before movement, and a cursor h1 indicates the cursor h after movement. Examples of the movement of the cursor include operations such as sliding (movement of a predetermined area), swiping (movement of a predetermined area), flicking (movement of a predetermined area), and pinch-in (enlargement of a predetermined area: reduction of a subject), pinch-out (reduction of a predetermined area: enlargement of a subject).

Figure 32:
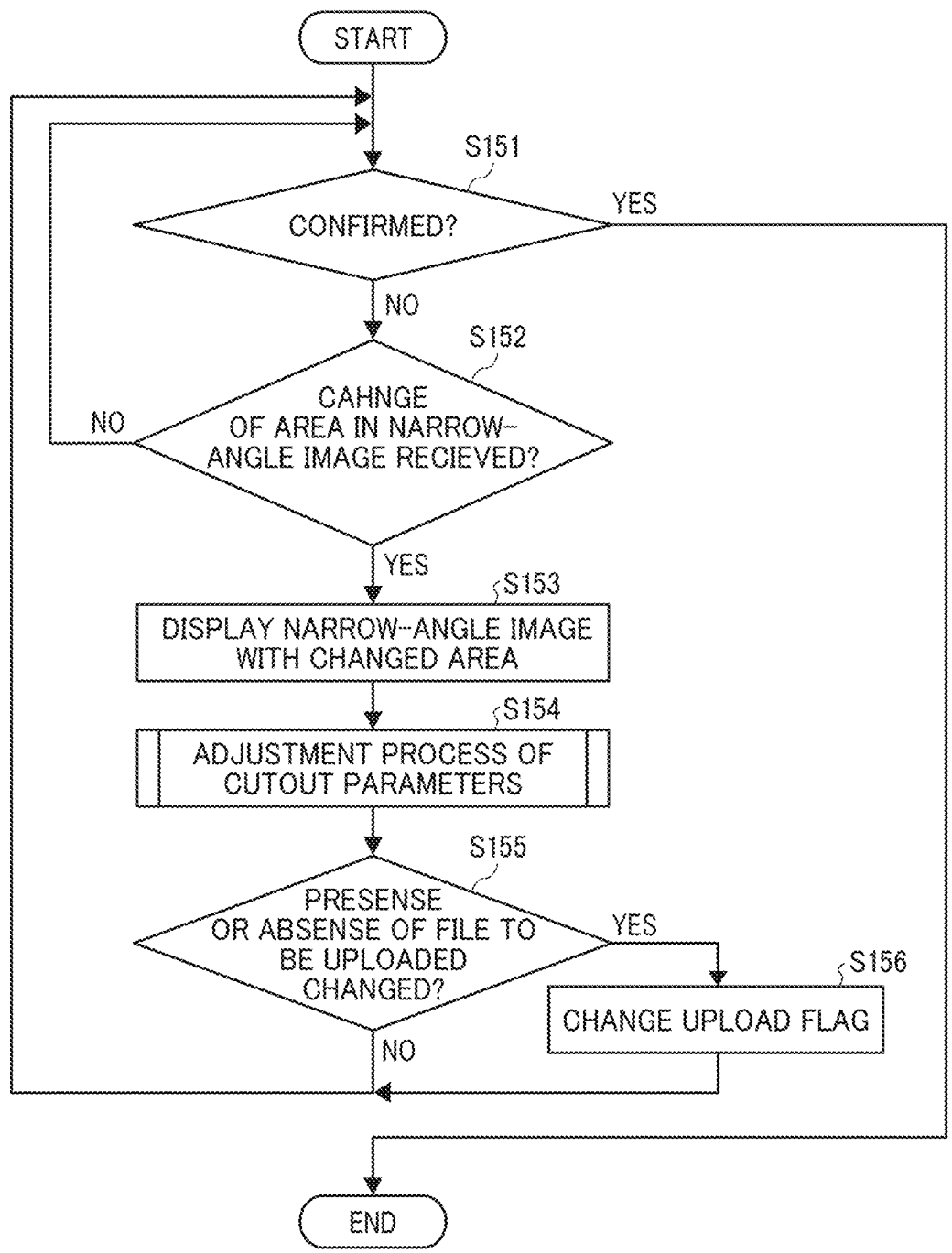
FIG. 32 is a flowchart illustrating a process of adjusting cutout parameters and changing an upload target.

Hereinafter, the process of changing the predetermined area of the narrow-angle image is described in detail with reference to FIGS. 32 and 33. FIG. 32 is a flowchart illustrating a process of adjusting cutout parameters and changing an upload target.

As illustrated in FIG. 32, the determination unit 25 determines whether the receiving unit 22 has received the pressing of the "confirm" button b1 by the real estate agent A (S151). When the receiving unit 22 has received the confirmation (YES in S151), the process of step S73 (the process of FIG. 32) is ended.

On the other hand, when the receiving unit 22 has not accepted the confirmation (NO in S151), the determination unit 25 determines whether the receiving unit 22 has received a change of the predetermined area in the narrow-angle image (S152). If the receiving unit 22 has not received the change (NO in S152), the process returns to step S151.

On the other hand, when the receiving unit 22 has received the change (YES in S152), the display control unit 24 changes the displayed narrow-angle image to a narrow-angle image represented by a changed predetermined area to display the narrow-angle image represented by the changed predetermined area (S153). Further, the agent terminal 2 performs the adjustment process of the cutout parameter according to the changed predetermined area (S154). Here, the process of step S154 is described in detail with reference to FIG. 33. FIG. 33 is a flowchart illustrating the adjustment process of cutout parameters.

Figure 33:
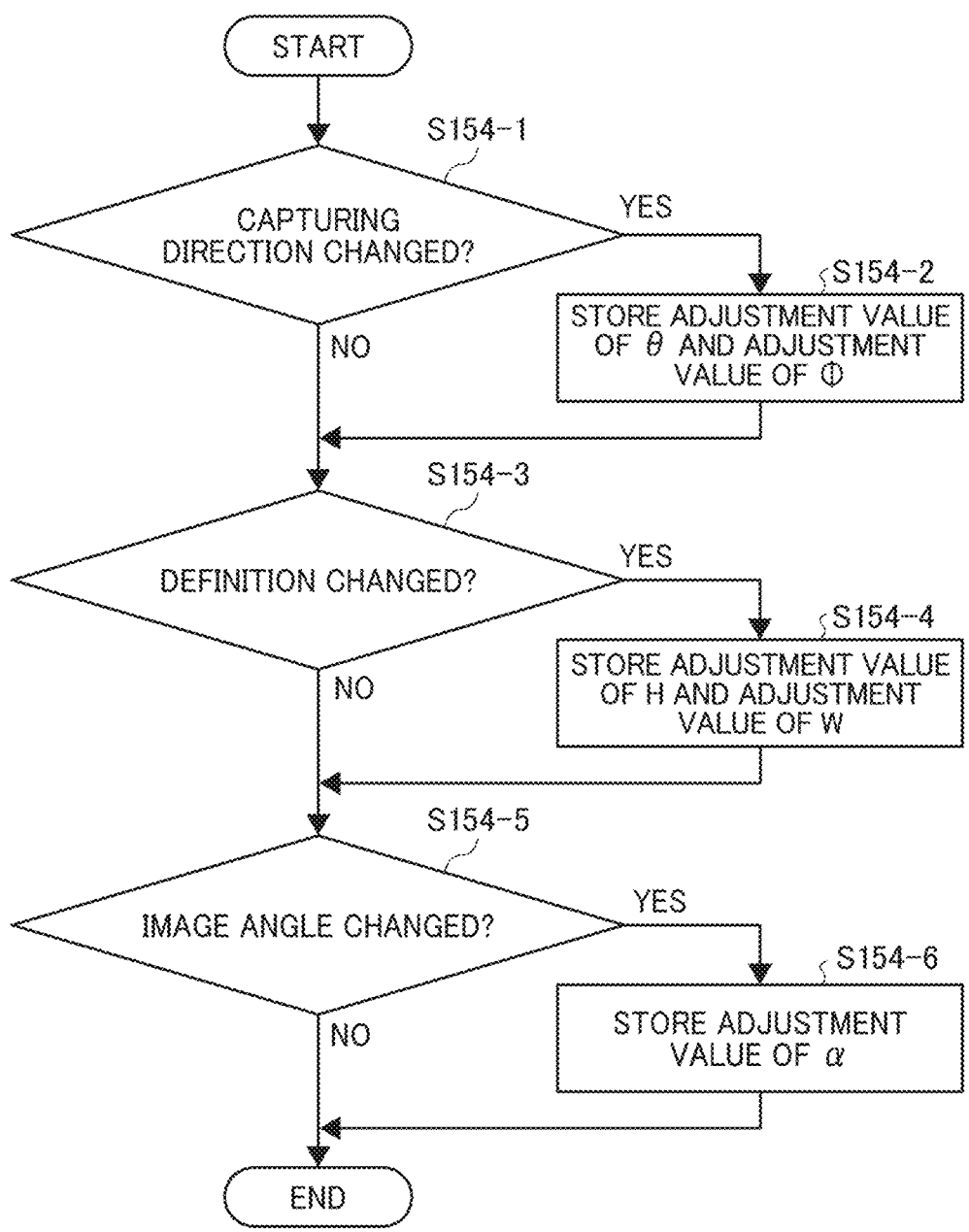
FIG. 33 is a flowchart illustrating an adjustment process of cutout parameters.

As illustrated in FIG. 33, the determination unit 25 determines whether the capturing direction of the virtual camera IC has been changed (S154-1). When the real estate agent A slides, swipes, or flicks the cursor h on the narrow-angle image to be changed, the capturing direction is changed. When the capturing direction has been changed (YES in S154-1), the storing-and-reading unit 29 stores the adjustment value of the cutout parameter (at least one of the pan angle θ and the tilt angle φ) corresponding to the change of the capturing direction in the storage unit 2000 (S154-2).

On the other hand, when the capturing direction has not been changed (NO in S154-1), the determination unit 25 determines whether the definition of the narrow-angle image has been changed (S154-3). When the real estate agent A pinches in or pinches out the cursor h on the narrow-angle image to be changed, the definition is changed. When the definition has been changed (YES in S154-3), the storing-and-reading unit 29 stores the adjustment value of the cutout parameter (at least one of the height H and the width W) corresponding to the change of the definition in the storage unit 2000 (S154-4).

On the other hand, when the definition has not been changed (NO in S154-3), the determination unit 25 determines whether the angle of view of the virtual camera IC has been changed (S154-5). When the real estate agent A slides, swipes, flicks, pinches in, or pinches out the cursor h on the narrow-angle image to be changed, the angle of view is changed. When the angle of view has been changed (YES in S154-5), the storing-and-reading unit 29 stores the adjustment value of the cutout parameter (angle of view α) corresponding to the change of the angle of view in the storage unit 2000 (S154-6).

Thus, the process of step S154 of FIG. 32 is completed.

Subsequently, the determination unit 25 determines whether the presence or absence of upload has been changed (S155). The real estate agent A checks or unchecks the check box at the upper right of each narrow-angle image to be changed, thereby changing the presence or absence of upload. Then, when the presence or absence of the upload has been changed (YES in S155), the storing-and-reading unit 29 changes the flag in the upload field of the cutout parameter management table of FIG. 15A (S156). For example, when the case of uploading is changed to the case of not uploading, the flag is changed from "TRUE" to "FALSE". In addition, when the case of not uploading is changed to the case of uploading, the flag is changed from "FALSE" to "TRUE". If there is no change in the presence or absence of upload (NO in S155) and after the process of step S156, the process returns to the processing of step S151.

Thus, the process of step S73 in FIG. 29 ends.

If the determination unit 25 determines that the narrow-angle image has been confirmed in step S151, the transmitting-and-receiving unit 21 transmits the selection result of the narrow-angle image to be uploaded to the image processing server 4 (S74). The selection result includes the image ID of the wide-angle image received in step S71 and the image ID of the narrow-angle image whose checkbox is checked in step S73. Further, if the narrow-angle image is changed in step S73, the adjustment value stored in the storage unit 2000 is also included in the selection result. Accordingly, the transmitting-and-receiving unit 41 of the image processing server 4 receives the selection result. Note that the transmitting-and-receiving unit 21 may transmit the changed cutout parameter obtained by changing the original cutout parameter itself without transmitting the adjustment value.

Management of Narrow-angle Image to be Uploaded

Next, with reference to FIG. 29, a description is given of a process of managing the narrow-angle image to be uploaded, which is executed by the image processing server 4.

As illustrated in FIG. 29, in the image processing server 4, the storing-and-reading unit 49 searches the cutout parameter management DB 4004 using the image ID of the wide-angle image and the image ID of the narrow-angle image received in step S74 as search keys, thereby rewriting the upload field of the corresponding cutout parameter management table to "TRUE" (S75). In the case where TRUE is already stored, rewriting is unnecessary. If an adjustment value has been received in step S74, the adjustment value is stored for each cutout parameter, as illustrated in FIG. 15B.

Next, the image processing unit 47 cuts out narrow-angle images from the wide-angle image using the cutout parameters managed by the cutout parameter management DB 4004 (S76). In this case, when the adjustment value is managed, the image processing unit 47 cuts out the narrow-angle images from the wide-angle image using the cutout parameters including the adjustment value.

Next, the storing-and-reading unit 49 stores the data of the narrow-angle image cut out in step S76, the image ID of the original wide-angle image from which the narrow-angle image is cut out, and the image ID of the cut-out narrow-angle image in association with each other in the image management DB 4001 (S77). In this case, the image ID of the wide-angle image and the image ID of the narrow-angle image constitute a single image ID. Thus, the wide-angle image already stored in step S16 and the narrow-angle image stored in step S77 can be distinguished and managed separately from each other. Then, the creating unit 43 creates, for each narrow-angle image, a URL including the single image ID of the narrow-angle image that has been united in step S77 (S78).

Next, the transmitting-and-receiving unit 41 transmits the URL of each narrow-angle image created in step S78 to the agent terminal 2 (S79). Thus, the transmitting-and-receiving unit 21 of the agent terminal 2 receives the URL.

As described above, the process of managing the narrow-angle image to be uploaded, which is executed by the image processing server 4, is completed.

Uploading of Real Estate Information Including Narrow-angle Image

Figure 34:
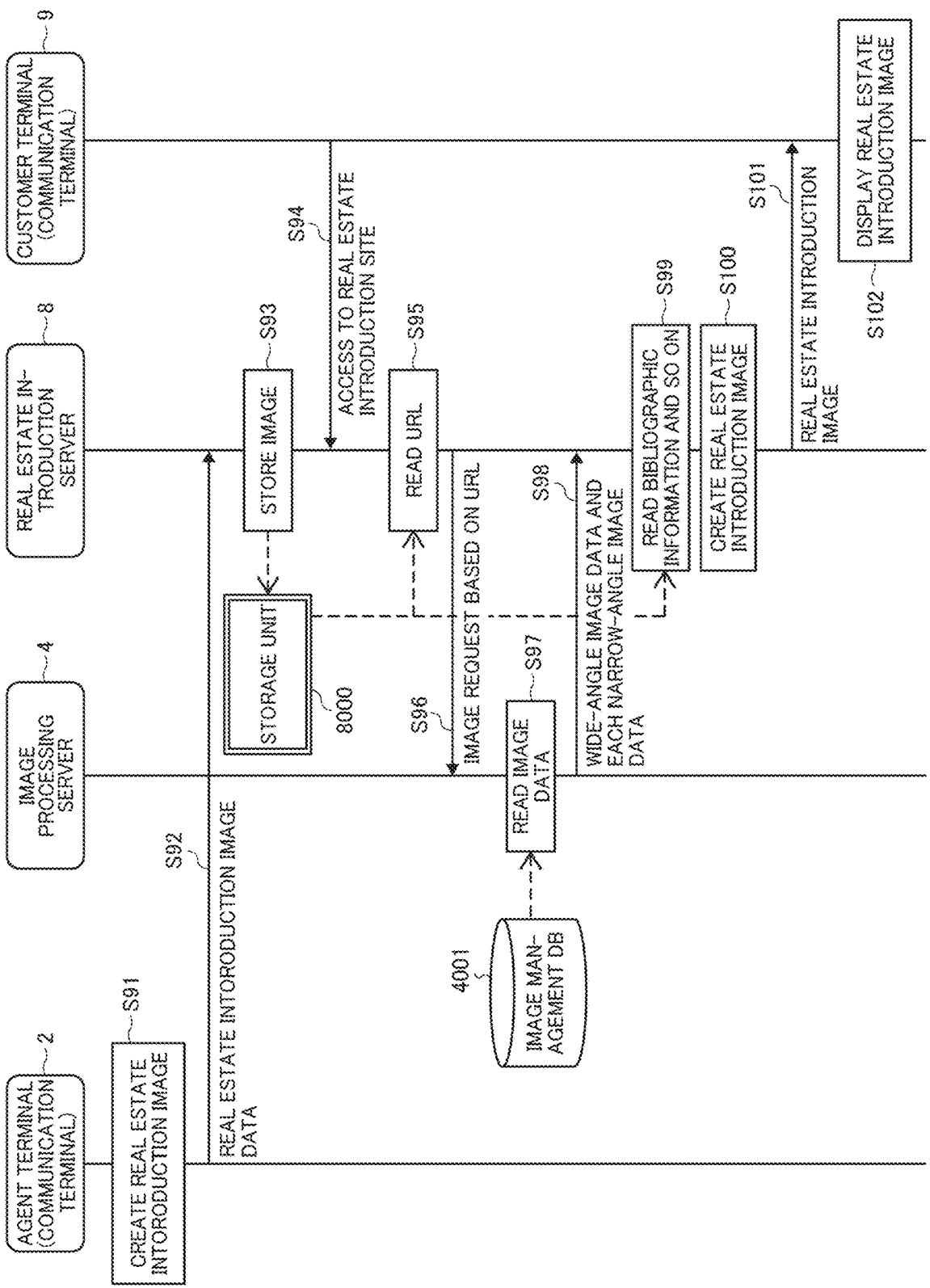
FIG. 34 is a sequence diagram illustrating upload processing and browsing processing of real estate information.

Next, a process of uploading real estate information including narrow-angle images from the agent terminal 2 to the real estate introduction server 8 is described with reference to FIG. 34. FIG. 34 is a sequence diagram illustrating upload processing and browsing processing of real estate information. Here, it is assumed that the URLs of the wide-angle image and the narrow-angle images have been acquired in advance for each building, for example, for each real estate property in the agent terminal 2.

First, based on the operation of the real estate agent A, the agent terminal 2 creates a real estate introduction image for introducing a real estate property (also referred to as a site for introducing individual real estate properties) as illustrated in FIG. 35 using a template or the like stored in advance in the real estate introduction server 8 (step S91). FIG. 35 illustrates a real estate introduction site. At this time, the URLs indicating the locations of the wide-angle image and the narrow-angle images in the image processing server 4 can be embedded in images of the real estate property. The receiving unit 22 receives inputs of bibliographic information such as a property name and a price and a floor plan from the real estate agent A. Accordingly, as illustrated in FIG. 35, the creating unit 23 creates the real estate introduction site including URLs indicating the locations of images that include bibliographic information c1 such as a property name and a price, a floor plan c2, a spherical image based on a wide-angle image (and an icon c3 for viewing the spherical image), narrow-angle images d1 to d5, and an enlarged narrow-angle image D.

Next, when the receiving unit 22 receives a transmission operation from the real estate agent A, the transmitting-and-receiving unit 21 uploads the data of the real estate introduction image to the real estate introduction server 8 (S92).

Next, the real estate introduction server 8 stores the data of the real estate introduction site in the storage unit 8000 of the real estate introduction server 8 (S93). In this case, the bibliographic information c1 such as the property name and the price, the floor plan c2, and the icon c3 for viewing a spherical image, which are illustrated in FIG. 35, are stored but the narrow-angle images d1 to d5 and the enlarged narrow-angle image D are not stored. Instead, for images such as the narrow-angle images d1 to d5 and the enlarged narrow-angle image D, URLs indicating the locations of these images are stored.

Thus, the process of uploading the real estate information including the narrow-angle image from the agent terminal 2 to the real estate introduction server 8 is completed.

Browsing of Real Estate Information by Customer Terminal

Next, with reference to FIG. 34, a description is given of a process of accessing the real estate introduction server 8 from the customer terminal 9 until the customer B browses the real estate introduction image.

As illustrated in FIG. 34, the customer terminal 9 accesses the real estate introduction site of the real estate introduction server 8 by the operation of the customer B (S94). Accordingly, the real estate introduction server 8 reads the data of the real estate introduction image from the storage unit 8000 (S95) and requests the wide-angle image and the narrow-angle images designated by the URLs from the image processing server 4 (S96).

The image processing server 4 reads the data of the wide-angle image and the narrow-angle images requested in step S96 from the image management DB 4001 (S97). Then, the image processing server 4 transmits the data of the wide-angle image and the narrow-angle images read in step S97 to the real estate introduction server 8 (S98). Thus, the real estate introduction server 8 acquires the images based on the URLs from the image processing server 4.

The real estate introduction server 8 reads out the bibliographic information c1 of the real estate property, the floor plan c2, and the various information of the icon c3 for viewing the spherical image from the storage unit 8000 (S99). The real estate introduction server 8 generates real estate introduction images based on the images acquired from the image processing server 4 in step S98, the bibliographic information read in step S95, and the like (S100). The real estate introduction server 8 transmits the real estate introduction images to the customer terminal 9 (S101). As a result, the customer terminal 9 displays the real estate introduction images as illustrated in FIG. 35 on the display 908 by a web browser (S102). FIG. 35 illustrates a state in which the customer B selects the narrow-angle image d5 and the narrow-angle image D obtained by enlarging the narrow-angle image d5 is displayed. Thus, the customer B can browse the real estate introduction images.

As described above, the process from when the customer B accesses the real estate introduction server 8 from the customer terminal 9 until the customer B browses the real estate introduction images is completed.

Effects of Embodiments

As described above, according to the present embodiment, a narrow-angle image to be cut out in accordance with the needs of a user can be obtained by using the structure of a building represented in a wide-angle image.

Supplementary Information

In the above-described embodiment, the wide-angle image is an original image from which a spherical (omni-directional) image is generated but is not limited thereto. The wide-angle image may be, for example, a non-spherical (non-omnidirectional) panoramic image or a general planar image (aspect ratio of 1:1, 3:4, 9:16, or the like). In addition, the wide-angle image may be an image of not only the entire region but also a partial region of a spherical image, a panoramic image, or a general planar image. In such a case, the narrow-angle image is a further partial image predetermined area image) of a partial image of a spherical image or the like.

Each function in the above-described embodiments can be implemented by one or a plurality of processing circuits. Here, the "processing circuit" in the present embodiment includes a processor programmed to execute each function by software, such as a processor implemented by an electronic circuit, and devices such as an application specific integrated circuit (ASIC), a digital signal processor (DSP), a field programmable gate array (FPGA), a system on a chip (SOC), a graphics processing unit (GPU), and a conventional circuit module designed to execute each function described above.

The invention claimed is:

1. An image processing apparatus configured to acquire an image that is a partial area of an image related to image data, the image processing apparatus comprising:
processing circuitry configured to acquire a narrow-angle image that is a partial area of a wide-angle image, based on a structure of a building represented in the wide-angle image that is an entire region or a partial region of the image related to the image data, wherein the processing circuitry is configured to acquire the narrow-angle image so that the narrow-angle image includes a boundary, having a relatively shortest length in a vertical direction in the wide-angle image, among a plurality of boundaries representing the structure of the building.

2. The image processing apparatus according to claim 1, wherein the partial area is an area designated by a pan angle.

3. The image processing apparatus according to claim 1, wherein the narrow-angle image is an image representing a composition in which a central portion of a range, surrounded by boundaries of the building, is located at a central portion of the narrow-angle image.

4. The image processing apparatus according to claim 3, wherein, among the plurality of boundaries in a room in the building, a range surrounded by a boundary indicating a ceiling and a range surrounded by a boundary indicating a floor are represented in equal proportions in the image.

5. The image processing apparatus according to claim 1, wherein the narrow-angle image is an image representing a structure in which the boundary is located at one-third of a horizontal width of the narrow-angle image.

6. The image processing apparatus according to claim 1, wherein the processing circuitry is configured to calculate an edge amount for each pixel constituting the wide-angle image, calculate importance in the wide-angle image based on a distribution of the edge amount, and acquire the narrow-angle image based on the importance and the structure.

7. An image communication system comprising:
an image processing apparatus configured to acquire an image that is a partial area of an image related to image data, the image processing apparatus including processing circuitry configured to acquire a narrow-angle image that is a predetermined area of a wide-angle image, based on a structure of a building represented in the wide-angle image that is an entire region or a partial region of the image related to the image data, wherein the processing circuitry is configured to acquire the narrow-angle image so that the narrow-angle image includes a boundary, having a relatively shortest length in a vertical direction in the wide-angle image, among a plurality of boundaries representing the structure of the building; and
a communication terminal configured to receive data of the narrow-angle image transmitted by the image processing apparatus and display the narrow-angle image.

8. The image communication system according to claim 7, wherein the processing circuitry of the image processing apparatus is configured to acquire a plurality of narrow-angle images from the wide-angle image and transmit data of the wide-angle image and parameters indicating partial areas as the plurality of narrow-angle images in the wide-angle image, and
wherein the communication terminal includes:
a display; and
processing circuitry configured to:
display, on the display, the plurality of narrow-angle images as the partial areas indicated by the parameters in the wide-angle image;
receive selection of a desired narrow-angle image from among the plurality of narrow-angle images; and
return, to the image processing apparatus, a specific parameter representing a partial area as the desired narrow-angle image received.

9. The image communication system according to claim 8, wherein the processing circuitry of the communication terminal is configured to:

receive adjustment of the partial area as the desired narrow-angle image among the plurality of narrow-angle images displayed on the display; and cause the display to display a narrow-angle image indicating an adjusted partial area in the wide-angle image.

10. The image communication system according to claim 9, wherein, in a case where the processing circuitry of the communication terminal receives selection of the narrow-angle image as the adjusted partial area, the processing circuitry of the communication terminal is configured to return an adjusted parameter indicating the adjusted partial area to the image processing apparatus.

11. The image communication system according to claim 7, wherein the partial area is an area designated by a pan angle.

12. The image communication system according to claim 7, wherein the narrow-angle image is an image representing a composition in which a central portion of a range, surrounded by boundaries of the building, is located at a central portion of the narrow-angle image.

13. The image communication system according to claim 12, wherein, among the plurality of boundaries in a room in the building, a range surrounded by a boundary indicating a ceiling and a range surrounded by a boundary indicating a floor are represented in equal proportions in the image.

14. The image communication system according to claim 7, wherein the narrow-angle image is an image representing a structure in which the boundary is located at one-third of a horizontal width of the narrow-angle image.

15. A non-transitory recording medium storing computer readable program code for causing a computer to execute:

acquiring a narrow-angle image that is a partial area of a wide-angle image, based on a structure of a building represented in the wide-angle image that is an entire region or a partial region of an image related to image data, wherein the acquiring includes acquiring the narrow-angle image so that the narrow-angle image includes a boundary, having a relatively shortest length in a vertical direction in the wide-angle image, among a plurality of boundaries representing the structure of the building.

16. The non-transitory recording medium of claim 15, wherein the partial area is an area designated by a pan angle.

17. The non-transitory recording medium of claim 15, wherein the narrow-angle image is an image representing a composition in which a central portion of a range, surrounded by boundaries of the building, is located at a central portion of the narrow-angle image.

18. The non-transitory recording medium of claim 15, wherein the narrow-angle image is an image representing a structure in which the boundary is located at one-third of a horizontal width of the narrow-angle image.

19. The non-transitory recording medium of claim 17, wherein, among the plurality of boundaries in a room in the building, a range surrounded by a boundary indicating a ceiling and a range surrounded by a boundary indicating a floor are represented in equal proportions in the image.

* * * * *